United States Patent [19]

Altenburger et al.

[11] 3,792,200

[45] Feb. 12, 1974

[54] MATRIX SWITCHING NETWORK CONTROL LINK INTERCONNECTION CIRCUIT

[75] Inventors: Otto Altenburger, Rochester, N.Y.; Robert H. Bansemir, Northlake, Ill.

[73] Assignee: Stromberg-Carlson Corporation, Rochester, N.Y.

[22] Filed: Nov. 3, 1972

[21] Appl. No.: 303,566

Related U.S. Application Data

[62] Division of Ser. No. 153,221, June 15, 1971, Pat. No. 3,729,593.

[52] U.S. Cl. .......................... 179/18 GE, 340/166 R
[51] Int. Cl. .............................................. H04g 3/42
[58] Field of Search. 179/18 GE, 18 GF; 340/166 R

[56] References Cited

UNITED STATES PATENTS 3,546,387 12/1970 Strunk ............................ 179/18 GE
3,621,147 11/1971 Perucca ......................... 179/18 GE

*Primary Examiner*—Ralph D. Blakeslee
*Attorney, Agent, or Firm*—Charles C. Krawczyk; William F. Porter, Jr.

[57] ABSTRACT

Matrix connector circuits for connection in series with separate groups of control links of a matrix switching network at the point at which the control links define unique paths between circuits connected to opposite ends of the network. The matrix connector circuits initially complete all the control links during the initial scanning steps in a path finding sequence. In the last scanning step, all the matrix connector circuits open all the control links while a selected matrix connector allows the scanning of its control links and allows the application of energization signals to opposite portions of a selected control link to complete the corresponding unique path through the network.

3 Claims, 29 Drawing Figures

PATENTED FEB 12 1974 3,792,200

SHEET 02 OF 22

MATRIX SWITCHING NETWORK CONTROL LINK INTERCONNECTION CIRCUIT

BACKGROUND OF THE INVENTION

This patent application is a division of a copending patent application entitled, "Path Finding System," Ser. No. 153,221, filed on June 15, 1971, now U.S. Pat. No. 3,729,593.

Through the use of concentrator stages between the subscriber equipment and the common control, respectively, the route selecting stages can be extended in such a way that a number of subscriber line circuits are remotely connected to a greatly smaller number of lines in a central exchange and also between the central exchange and a smaller number of outgoing trunk lines. In the use of large crosspoint switching matrices, for example, through a concentrator network, one of the problems is to establish access to the various free links of the matrix in order to effect interconnection therethrough on a free path from a calling subscriber to a transmission bridge (junctor) and/or to common control equipment (register, etc.), or between the transmission bridge (junctor or trunk circuit) and a terminating line circuit or outgoing trunk. There have been two basic systems proposed for effecting such path finding, which generally designates the determination of a free path through a combination of switching matrices. One of the methods for effecting such path finding is by way of multi-access control, accomplished by extending control leads into each of the stages of the link trunking, which may commonly have three stages, so as to provide for individual control on each of the separate links in the switching matrix. A second, and more preferred method, is the use of end-to-end selection which is accomplished by marking a calling line and marking the required junctor or trunk group or available common equipment.

The method of path selection used in a system has to be based upon the paths and links available through the network and a means of determining whether such links are free. One of the ways of accomplishing such path selection is based upon the existence of wired mark paths to indicate whether a link is free or busy and whether or not a call has terminated. This function may be performed along the mark paths in conjunction with the associated sleeve leads which effect a holding of the crosspoints at each stage of the network. In a previously developed path finding arrangement utilizing end-to-end marking, one end of the network, for example, the line circuit, is marked by a negative potential. This potential is allowed to spread via the mark leads (MK) in the direction toward the other end of the network where all of the outputs are marked with ground. Every mark lead of a link which is busy is broken, for example, by a guard relay actuated via the sleeve lead, and therefore the marking potential cannot extend through these busy links. At the other end of the network, only those outputs which display the marking signal represent a complete and free path through all switching stages to the originating point. A selector then scans the circuits in order and picks up the first free one which displays a marking signal. A low resistance ground is then applied to the mark lead of the selected path which operates the relays of all the switching stages in series and the relays are then held by a second winding via the sleeve lead.

The major difficulty with this known system is that each of the circuits connected to one end of the network are grounded at the same time so that the application of a marking potential to a single circuit connected to the other end of the network results in the spreading of a current through all of the free paths simultaneously thereby reducing the current detectable at each of the outputs in proportion to the number of links provided. In order to avoid the above mentioned difficulties, another known arrangement has been proposed for use especially with larger switchboard arrangements. In this known arrangement a negative marking potential, for example, is applied to one end of the network, such as a line circuit, as described previously. However, instead of providing ground simultaneously to each of the circuits at one end of the network, a scanner is provided for selectively sequentially appling ground to each of the outputs of the network, so that at any one instant current flow through the network will be confined to but a single path. In this way, the magnitude of the applied marking current can be maintained at a sufficiently low value to avoid unintentional actuation of crosspoints. If a circuit and all links between this circuit and the originating point are free, a current will develop which is detected by a current detector in the scanner, resulting in a stopping of the scanner at the selected output. The scanner then applied a ground signal continuously thus allowing all of the switching relays in series leading to the originating point to operate. All relays are then held again via the sleeve lead in the known manner.

The systems described above apply only to networks wherein but a single path exists between a terminating and an originating point. If multiple paths are available between a given input and a given output of the network, other arrangements obviously must be provided. One such arrangement is provided in a U.S. Pat. No. 3,485,956, filed Sept. 20, 1966, in the name of Adam A. Jorgensen, et al., which patent is assigned to the same assignee as the present application. The system disclosed in this patent includes apparatus providing a map or model of the switching network wherein for each link between the stages of the network includes a magnetic core for each mark lead and the sleeve lead is threaded through the corresponding core. When the link is in use the holding current flowing through the sleeve lead biases the core into a busy state. This map arrangement requires a large number of cores, one for each link, and a plurality of wires threaded through each core resulting in a rather expensive arrangement.

Since it is impossible to determine a single free path through a network wherein a plurality of paths exist between circuits connected to opposite ends of the network by end-to-end marking alone, a system is proposed in U.S. Pat. No. 3,542,960, filed Oct. 12, 1967, in the name of Gerhard O.K. Schneider, which patent is assigned to the same assignee as the present application, wherein in conjunction with end-to-end marking an individual stage scanning is provided on a step-by-step basis whenever necessary to select a single link from a multiplicity of links forming a part of the paths free and accessible to the marked input and output. The links in such stages are in this way selected sequentially with a holding mark being extended from one stage to the next as the path finding operation proceeds through the network. The controlled advance of the holding mark is made possible by isolation devices in the form of capacitors connected to each link of each stage and the progressive advance of the path is aided by restricting scanning at each stage to those links accessible to the selected link in the preceding stage. More particularly in this prior system, path finding is accomplished through the crosspoint switching network, for example, a service link network, by marking a selected circuit at one end of the network, i.e., a subscriber line circuit, with ground potential and sequentially applying a marking potential to available supervisory equipment of the desired type, for example, a register or dial pulse acceptor, until passage of a path finding current due to the marking potential from the selected supervisory device to the marked circuit is detected indicating at least one free path. The marking potential has to be applied as a pulse of a duration long enough to be detectable in the path scanner, but not long enough to operate any relays in the path. As soon as a valid pulse has been detected, scanning is stopped and suitable relays are actuated to hold the selected supervisory device only while actuating a scanner associated with the next selector stage of the network. This procedure is repeated in a step-by-step manner until a free junctor circuit is selected and a free link in each selection stage of the line link network forming part of a complete path with previously selected links and supervisory equipment is chosen and connected to form a complete path though the network. In this way, equipment selection can be effected along with path selection in a combined operation.

A characteristic feature of the system referred to in the Schneider patent resides in the provision of capacitors along each marked path for preventing passage of the prolonged d-c current applied for actuating a switching relay in any one selector stage from passing through to the next selector stage, which may have more than one link forming part of a free path to the marked line circuit, and inadvertently actuating relays therein. The capacitors are provided in the mark lead (MK) associated with a path checkpoint device situated between each stage, which path checkpoint device not only prevents the application of the prolonged d-c current forward to the next stage but also serves as a means for providing a holding potential for the previously selected links and supervisory devices. In addition, suitable diodes and choke coils are provided in the mark path to regulate the passage of the prolonged d-c actuating current while allowing passage of the transient check pulses.

However, it has been found that the provision of capacitors in each link for isolation purposes between stages is undesirable since these devices tend to add characteristics which may produce improper operation. For example, the increased capacity in the lines resulting from presence of these devices unfavorably affects the amplitude of the applied scanning pulses due to the changing effects thereof. In addition, this increased capacity increases the probability that surge currents may be generated and renders overshoot or ringing in the lines more possible. Thus, the system is susceptible to the generation of transients which may affect system reliability.

In switching networks including relay type crosspoint switches, a crosspoint relay is required to be actuated in each of the stages. In a multistage network, the greater the number of stages, the greater the number of crosspoint relays are required to be actuated in completing a path through the network. In general, the crosspoint relays to be actuated form a part of a unique series circuit through the network. Hence, as the number of crosspoint relays in a path increase, the impedance of the series circuit increases accordingly. To assure proper operation, a predetermined minimum amount of current is generally required to flow through the relays to assure that the relays will be positively actuated. Therefore, as the circuit impedance increases, the potential to provide sufficient current also is required to increase resulting in conflicting design problems, i.e., sensitivity of the relays versus circuit impedance.

It is a principle object of the present invention to provide a path finding arrangement of the type described wherein the difficulties and disadvantages inherent in known arrangements of a similar type are avoided or entirely eliminated.

It is another object of the present invention to provide a path finding arrangement for use in connection with crosspoint switching stages which make possible end-to-end marking where a plurality of paths exist between the circuit connected to opposite ends of the system.

It is another object of the present invention to provide a path finding arrangement of the type described based upon DC marking, eliminating the need for blocking capacitors in the mark path.

It is also an object of the present invention to provide a new and improved arrangement of dividng the path through the network into portions to reduce the series impedances of the crosspoint relay circuits and thereby assure sufficient current for proper operation.

It is a further object of the invention to provide a path finding arrangement of the type described which is characterized by improved reliability through the use of DC scanning.

It is still another object of the present invention to provide a path finding arrangement of the type described which ensures equal amplitude for all scanning pulses, reduced possibility of surge currents and overshoot or ringing in the lines, and elimination of transients.

It is a further object of the present invention to provide a path finding arrangement of the type described wherein determination of a single free path through the switching network is accomplished by relatively simple and economic means.

It is still another object of the present invention to provide a path finding arrangement for use in connection with crosspoint switching arrangements which makes available use of a re-entry function to provide for increased availability of existing lines or paths.

It is a further object of the present invention to provide a path finding arrangement wherein end-to-end marking is supplemented by selective control of successive switching stages in connection with a single current detector.

It is another object of the present invention to provide a path finding arrangement of the type described wherein means are provided to successively check each path for available links from one end of the network to the other.

It is still a further object of the present invention to provide a path finding arrangement of the type described wherein means are provided in connection with each switching stage to eliminate those paths not associated with previously selected switching links.

It is still another object of the present invention to provide a path finding arrangement of the type described which is applicable to large exchanges.

BRIEF DESCRIPTION OF THE INVENTION

The path finding system of the invention provides for effecting selection and interconnection of electrical circuits through a multistage matrix switching network including a plurality of matrix states interconnected by links to provide a plurality of paths between circuits connected to opposite ends of the network. A free path is selected through the network by sequentially identifying portions of the free path through successive scanning of stages in the network. Non-reactive means controls the progression of the sequential identification process in one direction through the network.

A plurality of connector circuit means are connected to separate groups of links between stages of the network wherein each link defines a single path available for connection to individual marked circuits connected to opposite ends of the network. The first portion of the path finding process includes the selection of one of the plurality of connector circuit means that includes a link that forms a portion of a free path between marked circuits at opposite ends of the network. the next step selects one of the links connected to the selected connector circuit means that forms a portion of a free path. When the link has been selected, signals are applied to the link to complete the selected free path through the network.

The path finding system of the invention also provides for an arrangement wherein any one of a plurality of marked circuits at one end of the network can be connected to any one of a plurality of free circuits at the other end of the network, wherein circuit means is provided for selecting one of the free circuits at the other end of the network having a free path through the network for interconnection to the marked circuit. The free circuit is selected prior to the selection of one of the plurality of connector circuit means.

The connector circuit means also includes optional provision for separating the selected free path into portions and separately energizing each portion, thereby reducing the impedance of the circuit to be actuated.

The path finding system of the invention also includes provisions for inactivating all connector circuit means except the one selected, thereby reducing the possibility of undesirably actuating more than one path due to feedback currents to circuits at opposite ends of the network.

In accordance with one embodiment of the invention, two circuits on opposite ends of the network are marked. The first step in the path finding procedure identifies a link of the matrix stage connected to one of the marked circuits including a free path to the other marked circuit, and thereby identified one of the plurality of connector circuit means. The next step of the path finding procedure identifies one of the plurality of links in the selected connector means included in the free path.

In accordance with a second embodiment of the invention, a circuit at one end of the network is marked for connection to any one of a plurality of free circuits at the other end of the network. The first step of the path finding procedure identifies a circuit at the other end of the network that is available for connection via free paths through the network to the marked circuit. The identified circuit selects one of the plurality of connector circuit means connected to the output links at the opposite side of the stage connected to the selected circuit. The next step of the path finding procedure identifies one of the plurality of output links included in the free path.

In accordance with a third embodiment of the invention, a plurality of circuits at one end of the network are marked for connection to any one of a plurality of free circuits at the other end of the network. The first step of the path finding procedure selects a circuit at the other end of the network that is available for connection via free paths to any of the marked circuits. The selected circuit selects one of a plurality of selector circuit means connected to separate groups of the links at the opposite side of the stage connected to the selected circuit for identifying a link forming a part of a free path. The selected selector circuit means selects one of the plurality of connector circuit means connected to separate groups of links of the next stage. The next step of the path finding procedure identifies one of the plurality of links in the selected connector circuit means that forms a free path between one of the plurality of marked circuits and the selected circuit.

In accordance with the present invention, the switching stages are separated into a plurality of switching modules. A generator of scanning pulses is connected to the outputs of the particular switching module associated with one of the circuits to be connected in a first stage of the network, or to the circuit itself, and a current detector is provided to determine when a free path is being scanned to the marked circuit at the other end of the network. When a free path is detected, the scanning is stopped. The selected link of the switching module in the first stage, or the free circuit determines which connector circuit means in the second stage must be scanned, which scanning is accomplished by marking the connector circuit means associated with the desired module thereby connecting the scanning device to the outputs thereof. This progressive scanning of the stages of the network continues for successive connection of the scanning device to each stage until a complete path from beginning to end is determined.

An important feature of the present invention resides in the fact that only DC paths are provided for the marking process. In effect, the isolation or blocking capacitors required in the previously proposed system are eliminated, thereby greatly improving the system reliability. Instead, switching network relays forming the selector circuit means and connector circuit means are provided to control the application of scanning pulses to the various stages at the proper times and to isolate the preceeding stages as necessary to provide proper functioning of the path finding scheme.

An additional feature of the present invention is the provision of the use of the path finding system of the invention with a re-entry operation which makes possible a greater availability of the parallel paths through the network, thus, increasing the traffic carrying capability of the network by permitting connection from a special outlet of a module from which no idle path can be found to various inputs of the first stage modules from which there may be available paths to the marked output.

DESCRIPTION OF THE PREFERRED EMBODIMENT

Figure 1:
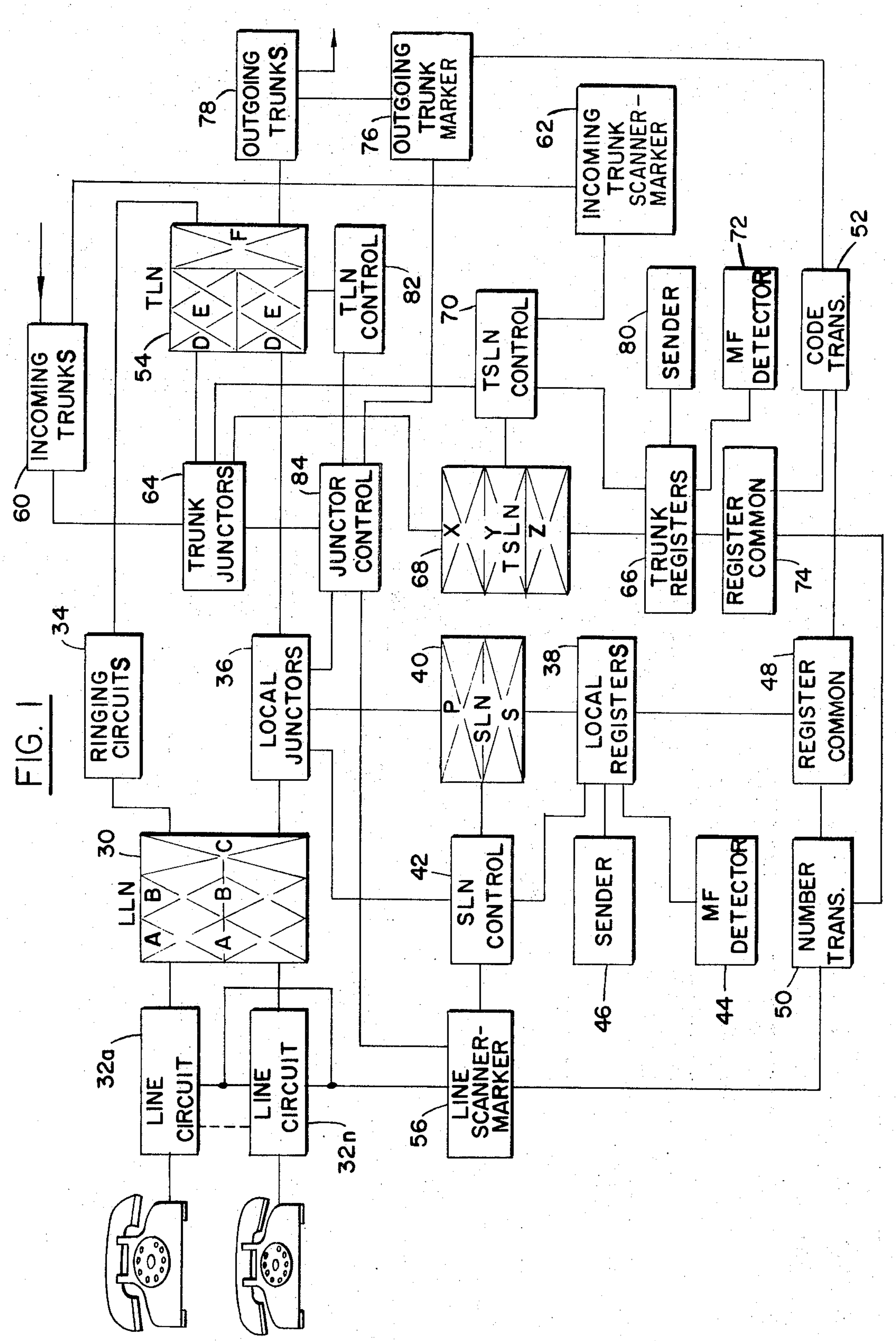
FIG. 1 includes a basic block diagram of a common control telephone system embodying the path finding system of the invention.

The switching system of FIG. 1 includes a line link network (LLN) 30 which functions as a concentrator for originating line calls and a fan out for terminating calls. The LLN consists of three stages of matrices, A, B and C, and is used for both originating and terminating types of traffic. The LLN 30 is connected at one end to a plurality of line circuits 32*a*–32*n*, which vary in number depending upon the telephone service to be offered. The line circuits 32*a*–32*n* are more fully described in a copending patent No. 3,708,627 to Otto Altenburger, entitled "LIne Circuit" and assigned to the assignee of the present invention. The line link network provides one unique path between circuits connected to opposite ends of the network. Each of the switching networks in FIG. 1 include matrix switches comprised of relays including a mark or control winding for initially actuating the relay and a hold or sleeve coil connected in series with its own contacts for maintaining the relay actuated after a path through the network has been established.

The C stage of the LLN provides the termination for both originating traffic from the line circuits 32*a*–32*n* and incoming traffic to the line circuits. These terminations of the LLN are connected to the local junctors 36 for originating traffic and the ringing controls 34 for terminating traffic. The number of local junctors and ringing controls provided depends upon the traffic requirements for the system. The ringing controls are more fully described in a copending patent application, Ser. No. 100,647, filed on December 22, 1970, and entitled "Ringing Control Circuit," in the name of Otto Altenburger and is assigned to the assignee of the present invention. The junctor circuit 38 and its control (junctor control 84) is more fully described in a copending patent application, Ser. No. 100,571, filed on Dec. 22, 1970 and entitled "Junctor and Junctor Control," in the name of Otto Altenburger and is assigned to the assignee of the present invention.

The local junctors 36 serve as the focal points for all originating type traffic. The local junctors include provisions for connecting the line circuits to the local registers 38 via a service link network (SLN) 40, and for providing transmission battery for calling and called parties on intraoffice calls. The local junctors 36 are under the control of the calling party. When trunk or station busy conditions are encountered, the local junctors 36 provide the busy tone to the calling party.

The service link network 40 includes two stages of matrices (P and S) and is controlled by a SLN control circuit 42 for connecting the calling line circuit 30*a*–30*n* (via one of the local junctors 36) to one of a plurality of local registers 38. The local registers 38, when connected to the local junctors 36, provide dial tone and include apparatus for acting on the subscriber instructions. The local junctors 36 terminate on the P stage and the dial pulse acceptors in the local registers terminate at the S stage. The dial pulse acceptors function as an interface between the local junctors 36 and the local registers 38. The dial pulse acceptors (DPA) provide the dial tone to the calling subscriber and also detect rotary dial pulses and extend the pulses to storage sections in the local registers. In the event of multifrequency signalling by the subscriber, the frequencies are detected by MF detectors 44 connected to the dial pulse acceptors. The local registers 38 consist of a DPA, register storage and register output and are connected to a sender 46 for providing outpulsing. The registers and senders are controlled by a register common 48 which contains the necessary control units. The local registers 38 are connected to the register common 48 on a time division multiplex basis wherein information is passed from one equipment to another on a common bus basis. The register common 48 is also connected to communicate with a number translator 50 and a code translator 52 on a time division multiplex basis. The translation circuits provide information such as equipment number, ringing codes and class of service. The number translator 50 is connected to the line scanner-marker circuit 56 which has the means to detect service requests and means to access the individual line circuits 32*a*–32*n*.

The ringing controls 34 connect ringing generators to terminating or called stations, detect off hook conditions (ring-trip) of the called station, and provide ringback tone for the calling station. Each line circuit can be connected to any of a plurality of ringing controls which are accessed from a trunk link network (TLN) 54 so that a ringing control is automatically connected to the terminating line circuit as soon as a connection to that line is complete.

A line scanner circuit 56 continuously checks the line circuits 32*a*–32*n* for an off hook condition. The line circuits are more fully described in a copending patent application, Ser. No. 153,235, entitled "Line Circuit With Lockout," filed on June 15, 1971, for Otto Altenburger. The line scanner-marker circuit 56 is used for both originating and terminating types of traffic. In the event of originating traffic, a line scanner stops when an off hook condition is detected and transmits the information from its counter circuits to a marker circuit to mark the particular line circuit 32*a*–32*n* and enables the SLN control 42 to initiate a path finding operation between an available local register and the line circuit requesting service. In the event of terminating traffic, the line scanner is controlled by the number translator, wherein the line scanner-marker receives an equipment number from the number translator to mark the line circuit 32*a*–32*n* with the particular equipment location. Furthermore, in terminating traffic, the line marker is also involved in transmitting the terminating subscriber classes of service, ringing code, busy or idle status, and types of ringing required through the junctor control 84 to the ringing control 34. The line scanner-marker circuit 56 is more fully described in a copending patent application, Ser. No. 101,091, filed on Dec. 23, 1970, entitled "Line Scanner and Marker," in the names of Gunter Neumeier and Otto Altenburger and is assigned to the assignee of the present invention.

In operation, when a telephone goes off hook, the line scanner-marker 56 detects the off hook condition and marks the line circuit connection to the A stage of the LLN 30. Simultaneously, the line scanner-marker circuit 56 signals the SLN control 42 to begin its path finding process for connecting the marked line circuit to one of the local registers 38. The SLN control detects and locates a path in a three step scanning process. The first scan locates the existence of a free path from a free local register 38 to the line circuit, and identifies the free local registers and its corresponding stage S matrix module. The second scan identifies a free path through a P stage matrix module. THe third scan identifies a free local junctor 36. The connection of the local junctor to the LLN 30 and the connection through the SLN 40 are now completed. When path finding is complete, the selected matrix relay coils in the LLN and the SLN are energized. The metallic connections through the tip and ring leads are checked. If the connection is complete, the sleeve coil connections are completed, and the connected local junctor 36 is seized. At this time, the SLN control 42 line scanner-marker circuit 56 is released, and the local register 38 is connected to the subscriber to receive dial information. Once the subscriber information has been dialed into a local register 38, the call must be routed either internally to another local subscriber, or externally to another exchange.

Incoming calls from other exchanges are applied to one of a plurality of incoming trunk circuits 60. An incoming trunk scanner-maker circuit 62 continuously scans the incoming trunks 60 looking for a seized incoming trunk circuit. When a seized incoming trunk circuit is located, a scanner circuit stops and transmits the trunk equipment number to a marker circuit, identifying the particular incoming trunk. The identified incoming trunk circuit is also connected to a trunk junctor 64 which is essentially identical to the local junctor 36, but is connected between the incoming trunk 60 and the TLN network 54 and a trunk service line network (TSLN) 68. The trunk junctor 64 functions as a focal point of all incoming type traffic and includes provisions for connecting the incoming trunk to any one of a plurality of trunk registers 66 via the trunk service line network (TSLN) 68. The trunk junctors 64 also provide incoming and called party with transmission battery, and when encountering either trunk or station busy conditions, returns a busy tone to the incoming call.

The TSLN control 70 functions to locate a path between the trunk junctors 64 and the trunk registers 66. The trunk junctors 64 are terminated on the stage X matrix modules of the TSLN 68 while the trunk registers 66 are terminated at the Z stage matrix modules. The TSLN 68 is divided into a number of separate grids. The incoming trunk scanner-marker circuit 62 signals the TSLN control 70 which of the grids will be used for accessing one of the trunk registers 66 as determined by the trunk junctor 64 involved in the connection. The trunk registers 66 include a dial pulse acceptor interface and subcircuits including register storage and register output. A multifrequency detector 72 is also connected to the trunk registers. The subcircuits and the multifrequency detector 72 are controlled by a register common control 74 on a time division multiplex basis. The register common is connected to communicate with the number translator 50 and the code translator 52 on a time division basis. The code translator is connected to the outgoing trunk marker circuit 76 to identify outgoing trunk groups 78. The outgoing trunk marker circuit is more fully explained in a copending patent application, Ser. No. 103,267, filed on Dec. 31, 1970, entitled "Outgoing Trunk Marker,"

filed in the names of Otto Altenburger and David Stoddard and is assigned to the assignee of the present invention. A sender circuit 80 is also connected to the trunk registers 66 to provide outgoing pulsing.

Since the trunk junctors 64 are identified by the incoming trunk scanner-marker circuit 62, only a two step scan is required in the path finding scheme of the TSLN control 70. In the first scan, a free path is detected between a free trunk register 66 and the seized trunk junctor 64 and the free trunk register is identified and marked, and the connected Z stage module is identified. The next scan locates a free path through the X and Y stage matrix modules to the marked trunk junctors 64 and energizes the mark relay coils through the Y and Z matrix modules and also energizes the mark relay coils through the Z stage matrix modules to the marked trunk register. When the connection between the trunk junctors 64 and the trunk registers 66 is completed, the metallic connections through the tip and ring leads are checked and then the sleeve connections are completed. The TSLN control and the incoming trunk marker 62 are now released. Once the incoming information has been received by one of the trunk registers 66, the call is either routed internally to a local subscriber, or externally to other exchanges via the outgoing trunk 78.

The TLN 54 provides for the termination of the local traffic to the local subscribers, the termination of incoming calls from other exchanges to the local subscribers, and for the connection of incoming calls from other exchanges to other external exchanges. The TLN 54 includes D and E stage matrices. When further expansion is necessary, an F stage matrix is included as illustrated. The D stage is the entrance to the TLN and is connected to the local junctors 36 and to the trunk junctors 64. The F stage is the exit of the TLN network and is connected via the ringing controls 34 to the LLN 30 and also to the outgoing trunks 78.

The path finding through the TLN 54 is under the control of the TLN control 82 and the junctor control 84. The TLN control 82 and the junctor control 84 work together in completing the termination portion of a call, whether it is an internally terminated call, or an outgoing call to a distant office. The number translator 50 and line scanner-marker 56 are used to complete calls to local lines, and the code translator 52, together with the outgoing trunk marker 76 complete calls to trunks. The path finding scheme of the TLN control 82 includes a two step scan. The local junctor 36, or the trunk junctor 64, have been previously marked (depending upon whether its an incoming call or locally generated call). Furthermore, the information in the local or trunk registers is transmitted from the registers via the register common 48 or 74 to either the number translator 50 or the code translator 52, depending upon whether it is a call terminating to a local subscriber, or a call going to a distant exchange, respectively. In the event of a call terminating to a local subscriber, the number translator 50 via the line scanner-marker circuit 56 marks the line circuit of the terminating call. In the event of an outgoing call, the code translator 52 via the outgoing trunk marker circuit 76 marks the particular outgoing trunk group 78.

The first scan of the TLN control detects a free path through the TLN 54 to either the marked outgoing trunk 78, or via the ringing circuit 34 and the LLN 30 to a line circuit *32a–32n*, and identifies the stage E module (the stage D module was identified by the seized local or trunk junctor). The next scan identifies and marks the input to the stage F module. The second scan also completes the connections back through the D and E modules to the marked junctor by energizing the matrix mark relay coils and also provides power through the F stage and the LLN to energize the mark relay coils. After a metallic path check is made via the tip and ring leads, the sleeve connections are picked up to complete the connection through the TLN.

The ringing control 34 now rings the called party. The connections through the LLN 30 and the TLN 54 and the local or trunk junctors 36 or 64 are maintained during the call under the control of the calling party. When the calling party hangs up, all the connections are broken. In the event the calling party still remains off hook after the called party hangs up, provisions are included in the junctor circuits so that the connections are broken after a preset period of time.

SLN SYSTEM

Figure 2:
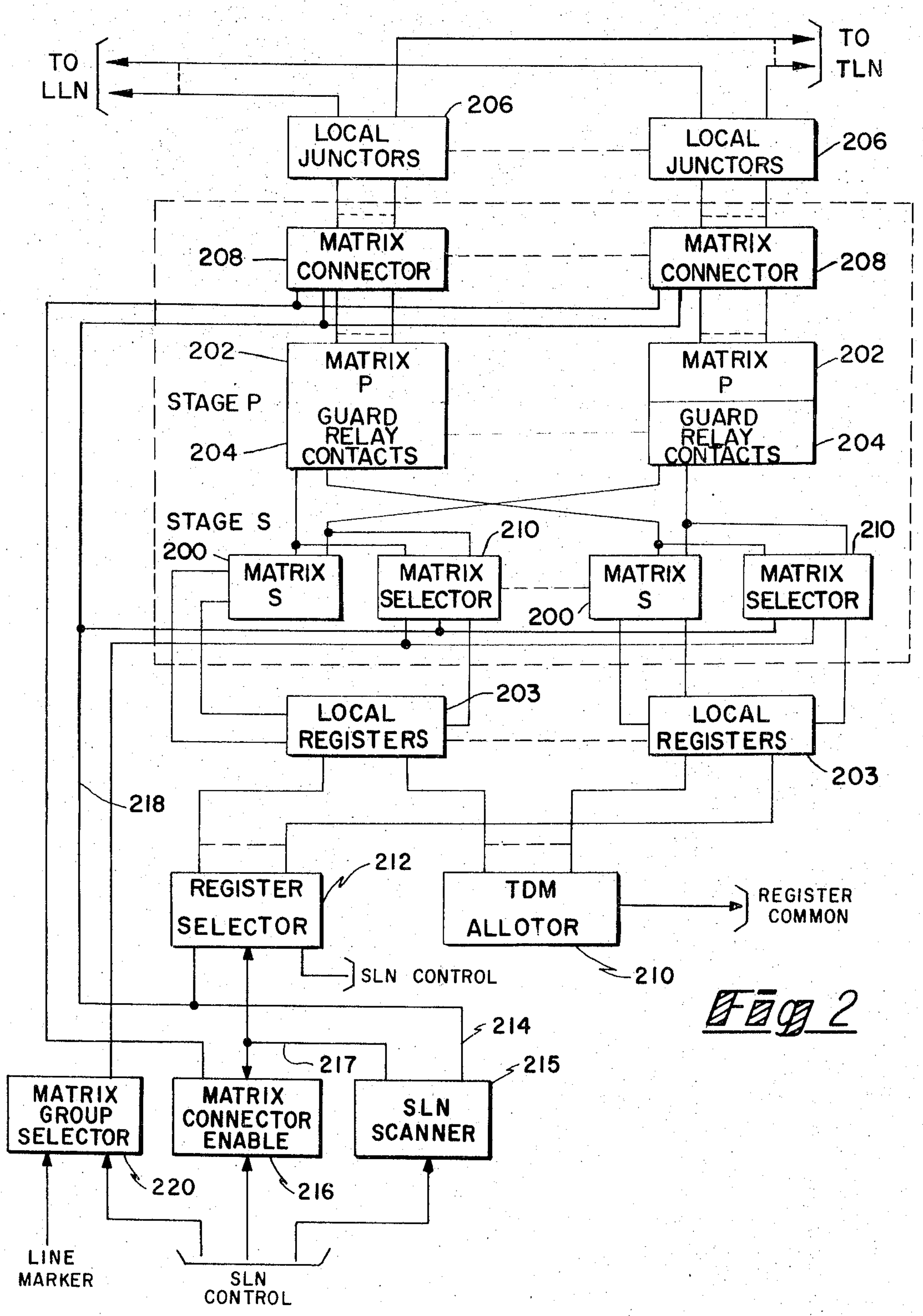
FIG. 2 is an expanded block diagram of the service link network (SLN) of FIG. 2 including one embodiment of the path finding system of the invention.

As illustrated in the expanded block diagram of FIG. 2, the SLN is a two stage matrix network, and is formed with a first S stage including, for example, four matrix modules 200, each having five inputs and four outputs, and a second P stage including sixteen matrix modules 202, each having four inputs and five outputs. The local registers 203 are connected to separate inputs of different stage S matrix modules 200. Each of the outputs of a respective module in the S stage is connected to respective inputs of the matrix modules 202 in the P stage via guard relay contacts 204. The outputs of a respective module in stage P are connected to local junctors 206 via the matrix connectors 208. A separate matrix selector circuit 210 is connected to the output links of separate S stage matrix modules. Thus, for a given local register 203 connected to an input of a stage S matrix module, a path may pass through any of the sixteen matrix modules in the P stage and through the corresponding matrix connector to one of the selected local junctors 206. The local registers 203 are connected to the register common via a time division multiplex (TDM) allotter 210. The local registers 203 are also connected to a register selector circuit 212.

As previously mentioned, the path finding process through the SLN includes three scanning steps. When a telephone goes off hook, the line scanner-marker 56 identifies the originating line and actuates a matrix group selector circuit 220 corresponding to the line group the originating line circuit is connected. The SLN control also conditions the matrix connectors 208 for the path finding procedure via a matrix connector enable circuit 216. In the first scan, pulses are applied from the SLN scanner 215 (line 214) via a register selector circuit 212 to a local register 203, the SLN, a free local junctor 206 and the LLN to a marked line circuit. When a current pulse is detected by the scanner (denoting a free path) the selected local register is identified and seized by the SLN scanner line 217 and thereby identifying its connected stage S matrix module by enabling the connected matrix selector 210. The register selector 212 is now released and during the second scan, pulses from the SLN scanner 215 are applied via line 214 and the enabled matrix selector to sequentially scan the output links of the selected S stage module until a current pulse is detected denoting the free path. At this time, the stage P matrix module 202 is identified and its matrix connector 208 is selected for scanning while all other matrix connectors are released. The matrix connectors 208 are connected to groups of link connections between the module 202 and the local junctors 206 wherein each link defines a single path available for connecting a line circuit to a local register. The matrix group selector 220 is now released and during the third scan, the scanning pulses are applied via line 214 and the selected matrix connector to select one of the free links and the remaining portion of the free path. When a current pulse is detected (free path), the SLN scanner 215 is stopped and the local junctor 206 in the free path is identified. The mark relay coils in the selected path are completed by the matrix connector in response to mark signals from the SLN scanner 215 via the matrix connect enable circuit 216 and line 213. One circuit energizes the mark relay coils in the LLN via the selected local junctor 206 while the other circuit energizes the selected mark relay coils in the selected stage P and S matrix modules. The two separate circuits provide separate parallel mark relay coil circuits, which, in turn, reduce the impedance of the overall mark circuits providing for more current flow from the battery for the rapid and positive pick-up of the mark relays. A metallic check of the tip and ring connections through the selected path is made to assure the connection is complete.

TSLN SYSTEM

Figure 3:
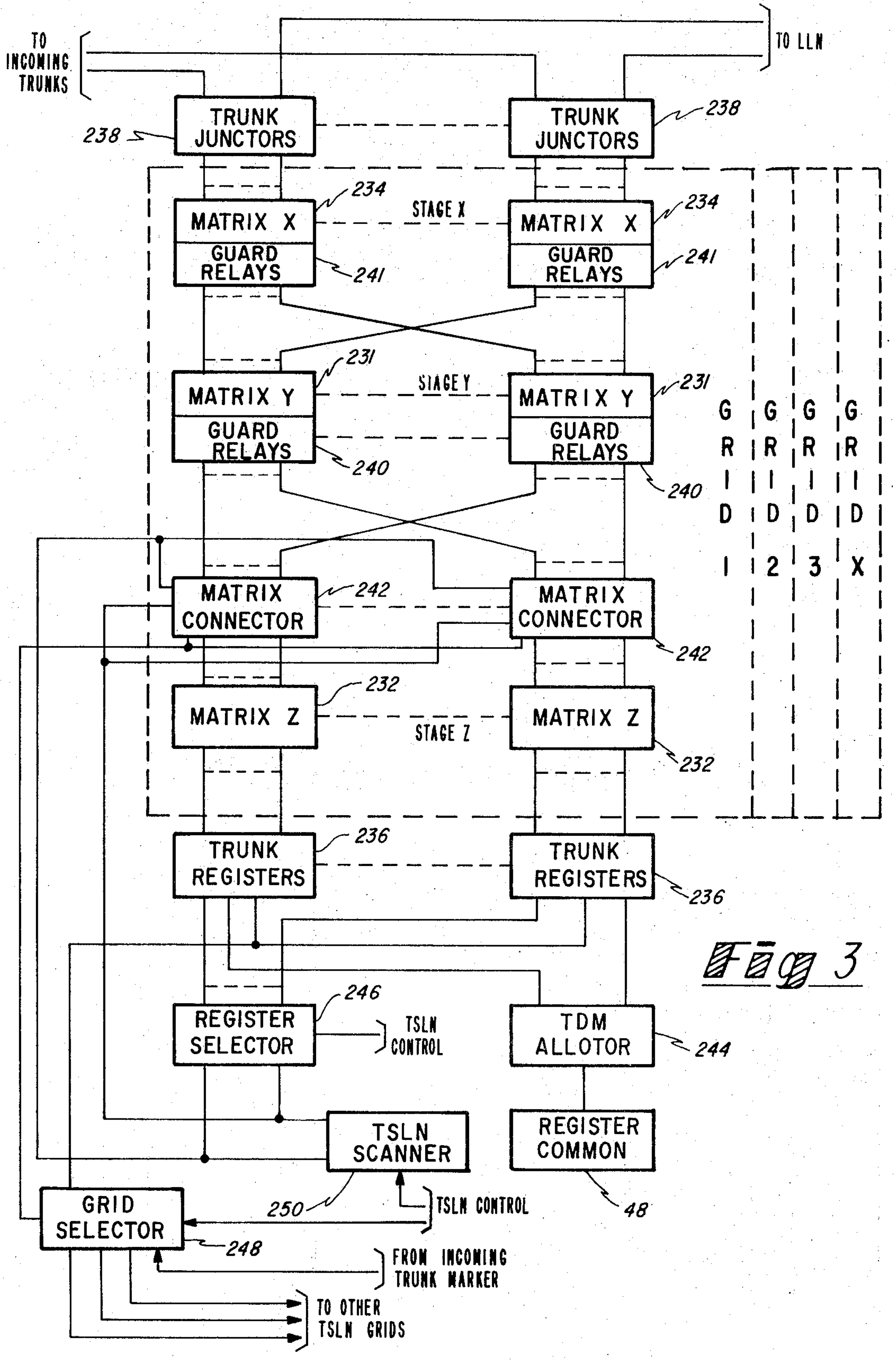
FIG. 3 is an expanded block diagram of the trunk service link network (TSLN) of FIG. 1 including a second embodiment of the path finding system of the invention.

The TSLN, as illustrated in the expanded block diagram of FIG. 3, includes four identical matrix configurations designated as grids 1-X. The number of grids are provided in the TSLN to provide greater accessibility to incoming calls. For purposes of simplifying the illustrations, only the block diagram of grid 1 is illustrated and it is to be understood that the other grids have identical configurations. As previously mentioned, the TSLN is a three stage matrix network and is formed of a first Z stage including, for example, five matrix modules 232, a second Y stage including five matrix modules 231 and a third X stage including ten matrix modules 234. A plurality of local registers 236 are connected to separate input of the Z stage matrix modules. A plurality of trunk junctors 238 are connected to the outputs of the stage X modules.

As indicated in FIG. 3, each of the outputs of a respective module 232 in the Z stage is connected to respective matrix modules 231 in the Y stage via the matrix connectors 242 and the guard relay contacts 240. The outputs of a respective module in the Y stage, are connected to inputs of respective modules in the X stage via guard relay contacts 241. Thus, from a given local register 236 connected to an input of a matrix module in the Z stage, a path may pass through any of the five modules in the Y stage and any of the ten modules of the X stage to any one of the trunk junctors 238. The local registers 236 are connected via a TDM allotter 244 to the register common 48 and also are connected to a register selector circuit 246 and a grid selector 248.

When an incoming call is initiated from an outside exchange, one of the trunk junctors 238 is marked. The TSLN control now must connect one of the local registers 236 to the marked junctor. The incoming trunk scanner-marker 62 enables a grid selector 248 that controls the particular grid connected to the marked trunk junctor. The grid selector 248, when enabled, conditions the matrix connectors 242 for the path finding procedure. As previously mentioned, the path finding process through the TSLN includes two scanning steps since a trunk junctor 238 is already marked and, therefore, the output of the connected X stage matrix module is identified. During the first scan, the registor selector circuit 246 is enabled by the TSLN control so that scanning pulses from the TSLN scanner 250 are applied via the register selector 246 for locating a free path through the TSLN from a free local register 236 to the marked junctor 238. When a current pulse, denoting a free path, is detected by the TSLN scanner, the free register is identified and seized by the TSLN scanner and the connected stage Z matrix module is identified. The marked local register applies a signal via the grid selector 248 to enable the matrix connector 242 connected to the selected stage Z matrix module for the next step of the path finding process and all other matrix connectors are released. The matrix connector 242 is connected to groups of link interconnections between the matrix modules 231 and 232 in the stages X and Z wherein each link defines a single path available for connecting a trunk junctor 238 to a trunk register 236. The register selector 246 is now disabled and during the second scan, scanning pulses are applied from the TSLN control to the enabled matrix connector 242 to select one of the free links and locate a free path from the output of the stage Z matrix. When a current pulse denoting a free path is detected, the terminating circuit is located, the path finding process is completed. In response to signals from the TSLN scanner, the enabled matrix connector 242 now completes two circuits for energizing the mark relay coils in the selected path. One circuit energizes the mark relay coils in the stage X and Y matrix modules and the other circuit energizes the mark relay coil in the stage Z matrix module. The sleeve coils are subsequently energized and the mark coils de-energized. A metallic check of the tip and ring connections through the selected path is made to assure the connection is complete.

TLN SYSTEM

Figure 4A:
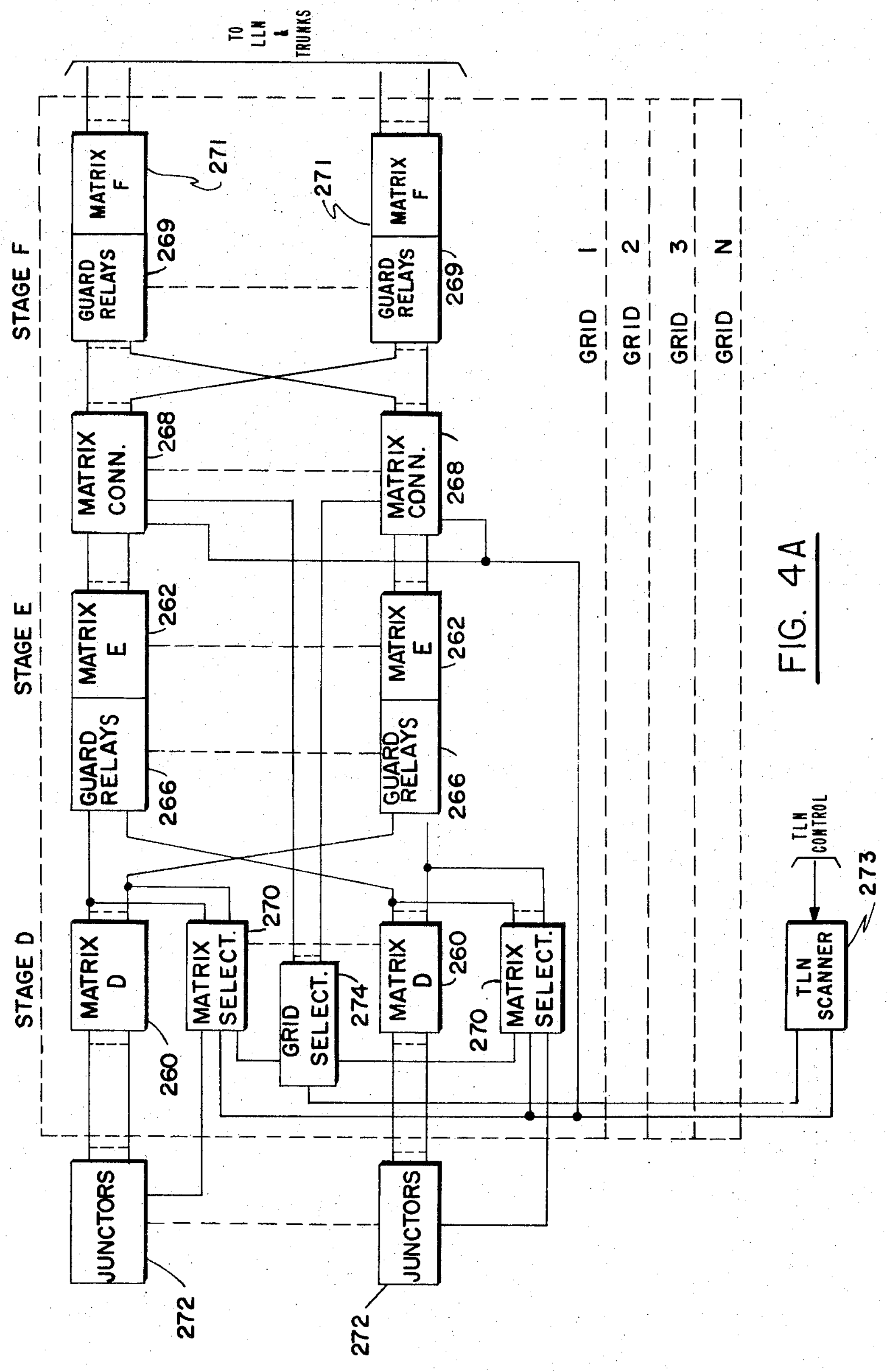
FIG. 4A is an expanded block diagram of the trunk link network (TLN) of FIG. 1 including a third embodiment of the path finding system of the invention.
Figure 4B:
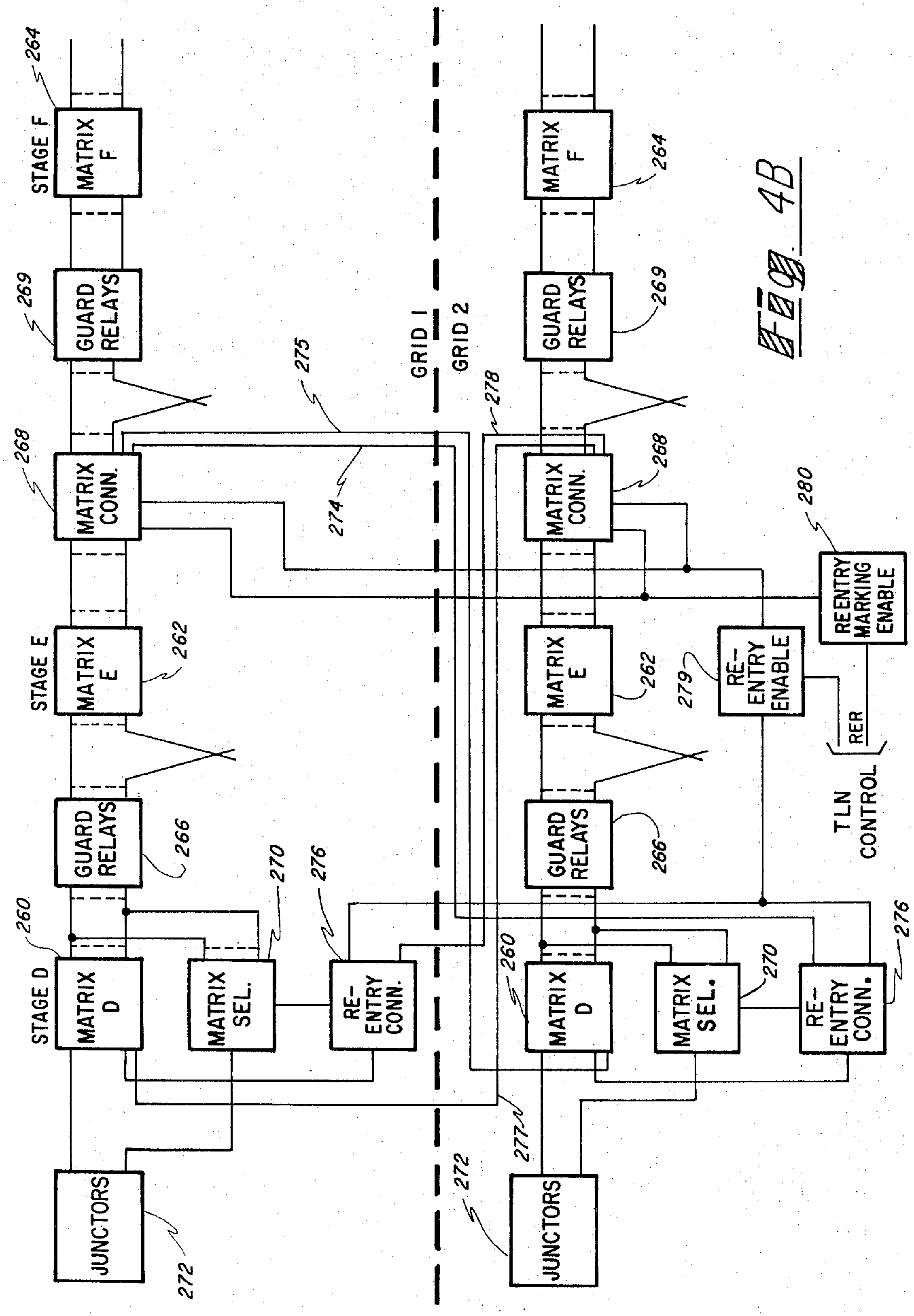
FIG. 4B is an expanded block diagram of the TLN network of FIG. 1 including provisions for re-entry in the event a path is not found during the first scan of the path finding system of the invention.

The trunk link network TLN illustrated in the expanded block diagram of FIG. 4A includes a plurality of matrix grids (1-N), however, for purposes of simplifying the illustrations, only the block diagram of grid 1 is illustrated, and it is to be understood that the grids have identical configurations. FIG. 4B includes a block diagram of a re-entry arrangement for the TLN in the event a free path is not located through the network during a first scan sequence to provide access to the other grids and/or the same grid. The TLN network and path finding will first be explained without the re-entry arrangement and it is to be understood that the system can function independent of the re-entry arrangement. As previously mentioned, the TLN is formed of a first D stage including, for example, five matrix modules 260 and a second E stage including fifteen matrix modules 262. For further selectivity, the trunk link network includes an added fifteen stage F matrix modules 269.

As indicated in FIG. 4A, each of the matrix modules 260 in the D stage connected to respective matrix modules 262 in the E stage via guard relay contacts 266. The other end of the matrix modules in the E stage are connected to the matrix modules 271 in the F stage via matrix connectors 268 and the guard relay contacts 269. Thus, from a given circuit connected to a matrix module in the D stage, a path may pass through any of the fifteen matrix modules in the E stage and the fifteen modules of stage F, through a unique path through the LLN 30 to a terminating line circuit 32a-32n, or directly to an outgoing trunk 78.

The incoming trunk junctors 64 and the local junctors 36 (FIG. 1) are designated as the junctors 272, which are connected to different inputs of various stage D matrix modules. A separate matrix selector circuit 270 is connected to each of the mark links connected to a stage D matrix module. The junctors 272 enable a matrix selector circuit 270 associated with the D stage matrix module connected to the seized junctor. The matrix selectors 270 are connected to a grid selector 274, which, in response to a signal from the enabled matrix selector 270 conditions all the matrix connectors 268 in the same grid for the TLN path finding process.

As previously mentioned, the path finding process through the TLN includes two scanning steps since a junctor 272 is already marked and the terminating circuit (outgoing trunk or line circuit) is also marked. In the first scan, scanning pulses are applied from the TLN scanner 273 to all the matrix selectors 270. However, only the matrix selector connected to the stage D matrix module connected to the marked junctor is enabled to pass the scan pulses. The scan pulses are sequentially applied to the mark links connected to the selected D stage module until a current pulse denoting a free path is detected by the TLN scanner 273. At this time, an E stage matrix module 262 is identified and its matrix connector 268 is selected for the second scan. The matrix connectors 268 are connected to groups of link interconnections between matrix modules 262 and 271 of stages E and F wherein each link defines a single path available for connecting a junctor to a trunk or line circuit. The matrix selector 270 is now disabled. When the matrix selector 270 is disabled, all matrix connectors exist for the seized unit drop out. Scanning pulses from the TLN scanner are now applied through the selected matrix connector to select one of the free links to the marked outgoing trunk or line circuit. When a current pulse denoting a free path is detected by the TLN scanner, the free path is identified. In response to a mark signal from the TLN scanner 273 via the grid selector 274, the selected matrix connector 268 now completes the circuit for energizing the mark relay coils in the free path. The connector marking circuit is separated into two portions wherein one circuit energizes the mark relay coils in the selected stage F matrix module and in the path through the LLN (in the case of a call terminating at a local subscriber) and the other circuit energizes the mark relay coils in the stages D and E matrix modules. A metallic check of the tip and ring connections through the selected path is made to assure the connection is complete. The sleeve coils are subsequently energized and the mark coils de-energized.

TLN RE-ENTRY SYSTEM

The TLN switching matrix and TLN control has provisions for a re-entry arrangement (FIG. 4B) for providing access from one grid to the other and/or access to other D stage modules in the same grid in the event that a free path between a selected D stage module and the corresponding F stage module is not available. As previously mentioned, the TLN has a plurality of grids. The re-entry arrangement allots one output from each of the E stage matrix module (via its matrix connector) for re-entry. The allotted outputs from the stage E matrix modules are divided into groups wherein each group is connected to the input of a separate D stage in another grid. In addition (depending upon the number of grids in the network) any excess stage E matrix outlet can be connected to another input to a D stage in the same grid. For example, if there are four grids, there are five matrix modules in the D stage in each grid and there are fifteen matrix modules in the stage E in each grid, an allotted connection from each of the first five stage E matrix modules of one grid is made to separate ones of the five D stage modules in another grid, and a connection from the next five stage E matrix modules is made to separate ones of the D stage module in another grid, and a connection from the last five E stage matrix modules is made to separate ones of the D stage modules in the fourth grid. If only three grids are available, a connection from the last five allotted E stage is made to separate inputs of the D stage modules in the same grid.

FIG. 4B includes a simplified block diagram of the TLN network including the re-entry arrangement. The tip and ring leads from the last link to the matrix connector 268 in grid No. 1 are wired via line 275 to the D stage module 260 in grid No. 2. The mark and sleeve leads for the same link are connected via line 274 through a re-entry connector circuit 276 to the same stage D matrix module 260 in grid No. 2. In a similar manner, the tip and ring leads of the allotted link to the matrix connector 268 in grid No. 2 are wired via line 277 to the D stage module in grid No. 1 while the corresponding mark and sleeve leads of the same link are connected via line 278 through a re-entry connector 276 to the same D stage matrix module 260 in grid No. 1. The trunk circuits 78 and/or ringing circuits 34 are connected in multiple to the various stage modules in both grids providing a connection from each grid of the TLN to each trunk circuit and/or ringing circuit.

If during the first scan of a TLN network (stage D), no free path is found, a re-entry enable circuit 279 is enabled by the TLN control, and a second scan is initiated. During the second scan, the links connected to the same stage D module are rescanned. If a free path is detected, the scanning pulses are applied to a selected matrix connector. If a free path is found in the links other than the link allotted for re-entry (last link) a path through the TLN network has become free and the re-entry enable circuit is released. If a free path was found through the link allotted for re-entry, a signal is transmitted through the re-entry enable circuit to operate the corresponding re-entry connector circuit. The matrix selector now completes the circuit for energizing the mark relay coils in the stages D and E. In addition, a re-entry request signal RER is applied to a re-entry marking enable circuit 280, which enables all the matrix connectors in all the grids for the re-entry path finding sequence. At this time, the free path through the D and E stages and the matrix connector previously scanned is completed and the sleeve connection is made so that the tip and ring connection from the matrix connector are connected to an input of the D stage of another grid. The corresponding mark leads are connected through the matrix connector 276 to the same input of the stage D matrix module in the other grid.

The re-entry circuit 276 enables the corresponding matrix selector circuit 270. A re-entry scanning sequence is now initiated in the same manner as previously described with regards to FIG. 4A to detect a free path between a marked D stage input and a marked F stage circuit in the second grid. When a path is identified in the second grid, the path will be marked. The re-entry connector now switches through the sleeve leads putting the tip, ring and sleeve leads of both grids in series. With the re-entry arrangement, the path between a junctor 272 and the output from the TLN matrix extends through the TLN matrix, stages D and E in two grids, and stage F in one grid. If a path is not available after the first re-entry scan, a no path available NPA signal will be transmitted to the TLN control.

SCANNER CONTROL

Figure 5:
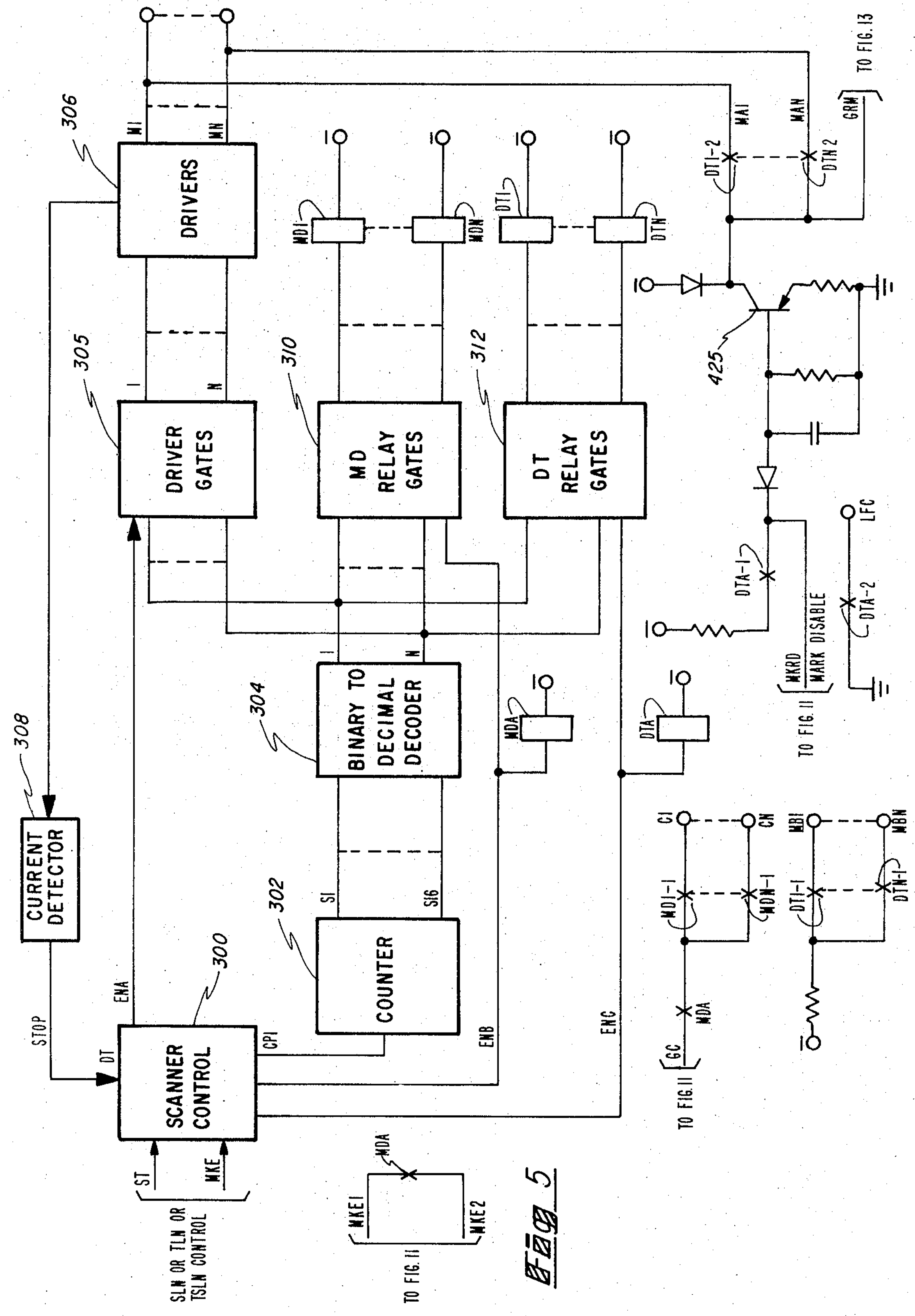
FIG. 5 is an expanded block diagram of the scanner control system included as a portion of the SLN control, TSLN control and TLN control of FIG. 1.

FIG. 5 includes an expanded block diagram of the scanner system and relay output circuits included as a portion of each of the SLN control 42, TSLN control 70 and TLN control 82 (FIG. 1). The scanner system is the subject of a copending patent No. 3,718,907 to Otto Altenburger, entitled "Scanning Circuit" and assigned to the assignee of the present invention. The scanner system includes a scanner control circuit 300 which provides the clock pulses and control signals for sequencing the path finding steps in response to various control signals applied thereto from the remaining portions of the corresponding control. The scanner control 300 also includes provisions for functioning as an allotter to distribute the traffic through the various matrices.

Clock pulses are applied from the scanner control 300 to a binary counter 302 via the lead CPI. The output circuits from the binary counter 302 are connected to a binary-to-decimal decoder 304. The output leads from the decoder 304 are connected to a plurality of driver gates to actuate individual ones of a plurality of driver circuits 306 in consecutive sequence to provide sequential ground pulses at the output circuits MI-MN. The driver gates 305 are enabled by clock synchronized signals ENA from the scanner control 300. The scanning signals from the drivers 306 are applied to their respective SLN or TSLN or TLN switching networks for locating a free path in a manner as will be explained in a later portion of the specification. When a free path is found, a current pulse is transmitted through a driver circuit and is sensed by a current detector circuit 308, which, in turn, applies a stop scan signal to the scanner control 300.

The output circuits of the decoder 304 are also connected to a MD relay gate circuit 310 and a DT relay gate circuit 312. The gate circuit 310 is enabled by a signal EMB from the scanner control, while the gate circuit 312 is enabled by a signal ENC. The ENB signal is generated at the end of the first scan in the scanning sequence by the TSLN control and the TLN control and at the end of both the first and second scans in the path finding sequence in the SLN control. The signal ENC is present when a complete path has been found at the end of the last scan in each of the SLN, TSLN and TLN controls. The output of individual ones of the gates in the gate circuits 310 are connected to separate ones of the relays MDI-MDN. The output of individual ones of the gates in the gate circuits 312 are connected to separate ones of the relays DTI-DTN. A relay MDA is energized during the presence of the EMB signal while a relay DTA is energized during the presence of the ENC signal.

In response to a start signal ST applied to the scanner control 300, clock pulses are applied to the binary counter 302 and the driver gates 305 are enabled in synchronism with the clock pulses by the ENA signal so that the drivers 306 develop successive ground signals at its output terminals MI-MN. The current detector 308 is actuated in response to the location of a free path to apply a stop signal to the scanner control 300, which, in turn, stops the counter 302 at a count corresponding to the free path. During the presence of the ENB signal, the decoder circuit 304 energizes one of the relays MDI-MDN corresponding to the free path. In the case of the SLN path finding sequence, the same procedure is repeated during the second scan and the relays MDI-MDN are actuated for a second time after the second scan. At the start of the second scan of the TSLN and TLN controls and the third of the SLN control, a MKE signal is applied to the scanner control 300. The ENC signal is generated at the end of the last scan that enables the gate circuits 312 to actuate one of the relays DTI-DTN corresponding to the free path.

Figure 6:
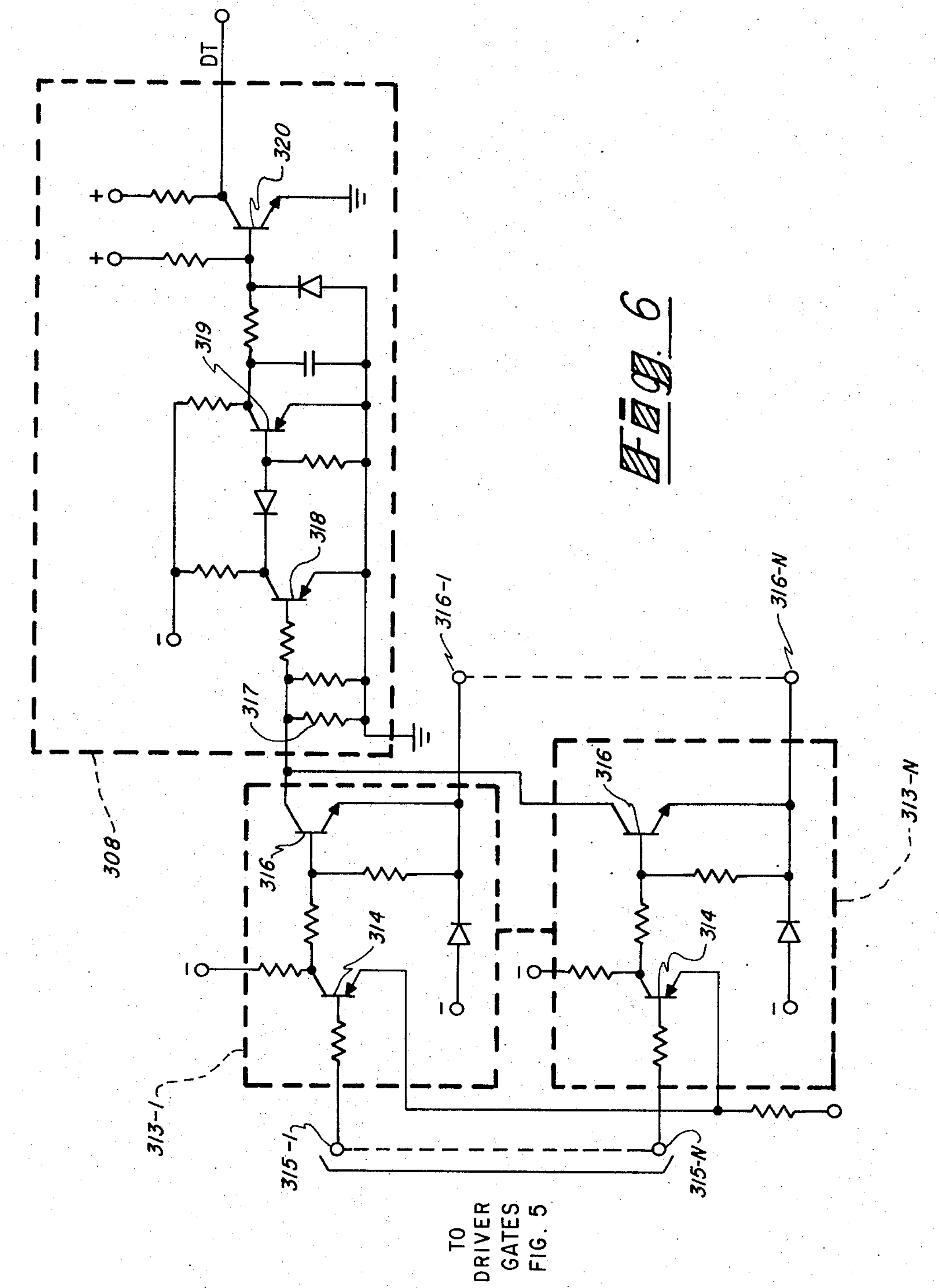
FIG. 6 is a schematic diagram of the driver gates and current detector circuit of FIG. 5.
Figure 7:
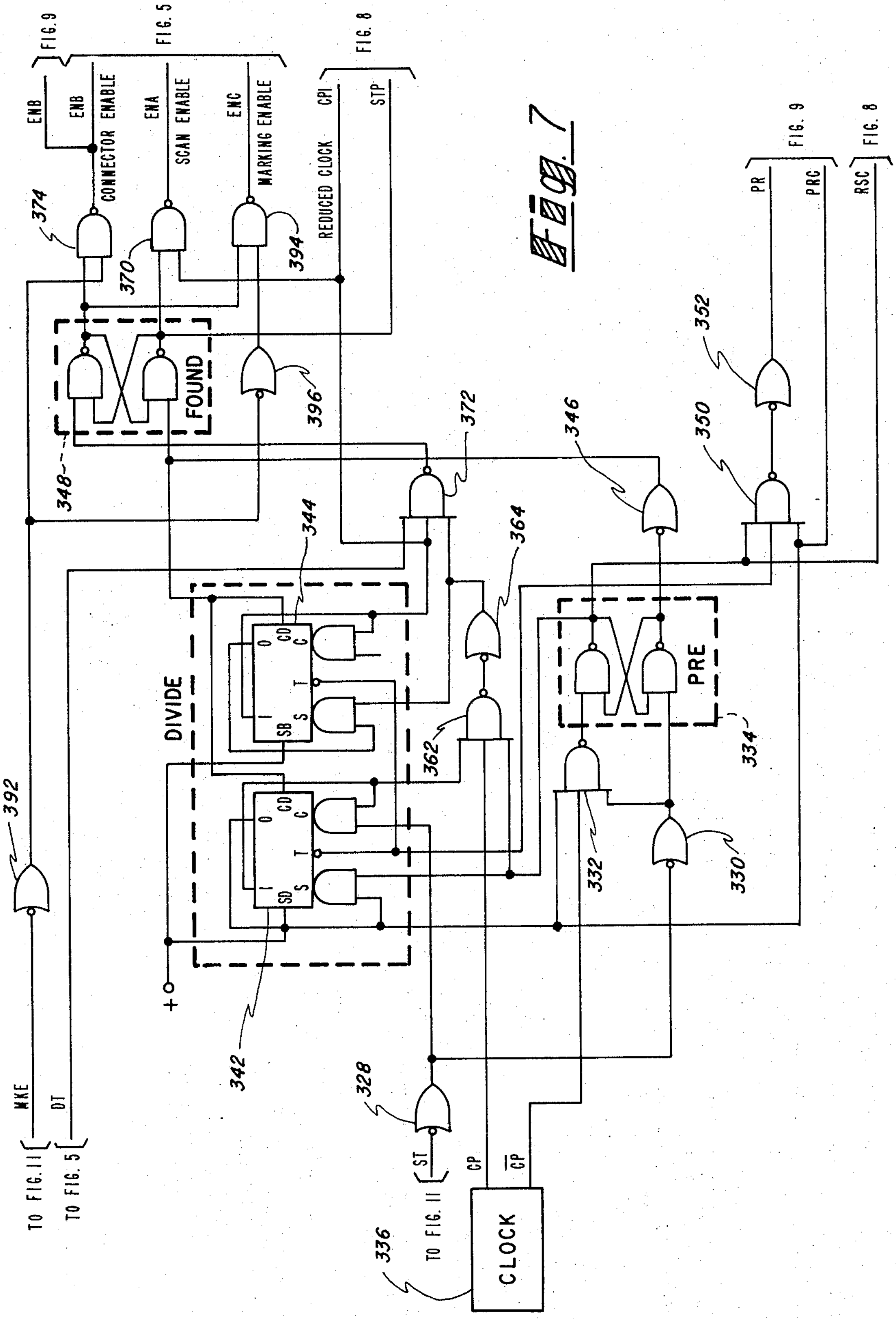
FIGS. 7–9 include a logic schematic diagram of a scanner control system of FIG. 5.
Figure 8:
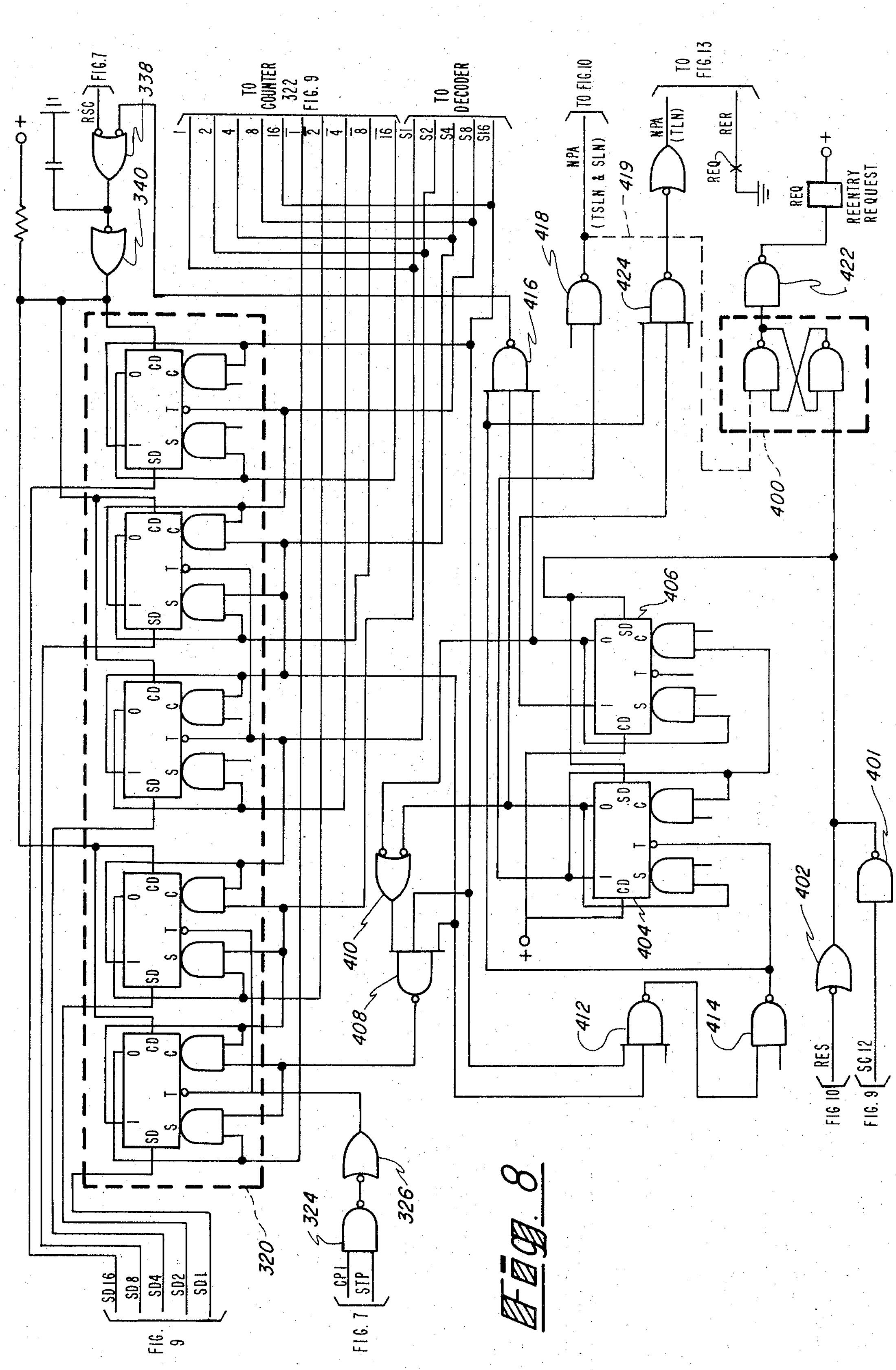
Figure 9:
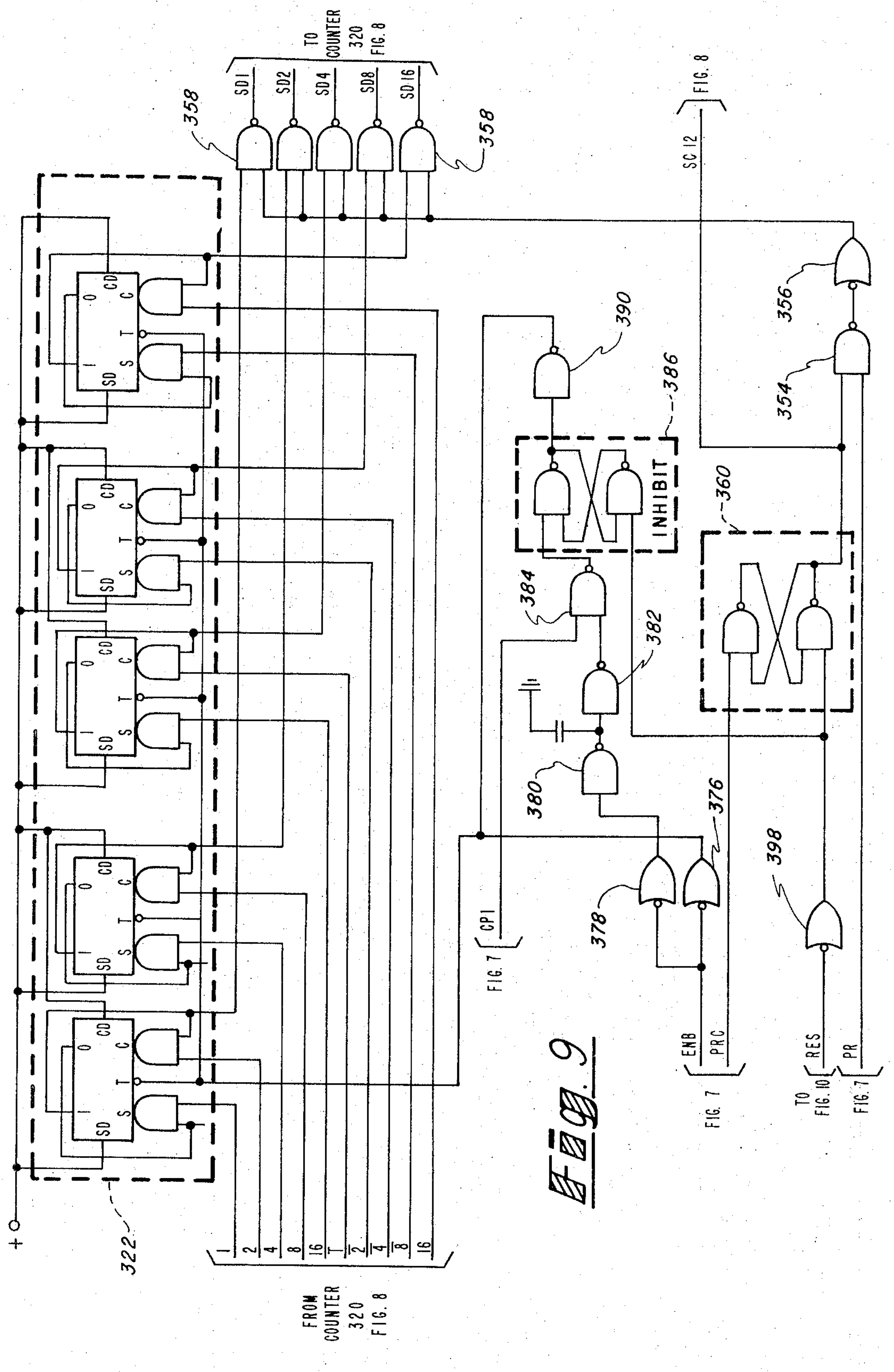

The scanner system will now be more fully explained with regards to FIGS. 7–9. The driver circuits 306 and current detector 308 are schematically illustrated in FIG. 6. Each driver circuit 313-1 through 313-N includes a pair of transistors 314 and 316 connected in a direct current switching circuit that is responsive to a signal on the terminals 315-l through 315-N from the driver gates 305 to apply a ground signal to the output terminals 316-1 through 316-N via a resistor 317 in the current detector circuit 308. The current detector circuit 308 includes an amplifier stage, including three direct coupled transistors 318, 319 and 320, that produces a path found signal DT in response to a current flow through the resistor 317.

The counter circuit 320 (FIG. 8) and the memory or storage counter circuit 322 (FIG. 9) each including five flip-flop circuits arranged as a binary counting circuit. The counter circuit 320 counts the clock pulses received from the terminals CPI through the gates 324 and 326, and transmits the count to the decoder circuit 304 via lines S1 through S16. At the beginning of a path finding sequence, the storage counter 322 includes a count corresponding to that accumulated in the scanner counter 320 at the end of the first scan in the previous completed path finding sequence.

At the start of a scanning sequence, an ST signal (FIG. 7) is applied from one of the common control circuits (SLN control, TSLN control or TLN control) to an inverter circuit 328. The output from the inverter circuit 328 is transmitted through an inverter 330 and a gate 332 to "set" a pre flip-flop 334 during the presence of a CP signal from a clock circuit 336. The flip-flop 334 when set: (1) enables the counter 320 via the line RSC and gates 338 and 340; (2) enables the flip-flop circuits 342 and 344 via the inverter 346, and (3) resets a found flip-flop 348 via the gate 346. During the next clock pulse CP, the gates 350 and 352 apply a preset scanner signal PR through the gates 354 and 356 (FIG. 9) which, in turn, partially enable a plurality of memory transfer gates 358. The second input to gates 358 are connected to the various flip-flop stages in the storage counter 322. The output of the gates 358 are connected to the set inputs of the scanner counter 320 so that the preset count in the storage counter 322 is transferred into the scanner counter 320. This allows the scanner counter 320 to preset at the start of each new scanning sequence to a count corresponding to the count previously reached in the first scan of the prior path finding sequence wherein the arrangement functions as an allotter to distribute the traffic through the network rather than concentrating on the first group of matrix links or registers.

The trailing edge of the clock pulse CP sets the flip-flop 342, which, in turn, applies a signal on the lead PRC. The PRC signal sets a flip-flop 360 (FIG. 9) which, in turn, disables the gate 354 and prevents any further transfer of the counts from the storage counter 322 to the scanner counter 320 until the path finding sequence is complete and a final reset signal RES (from the SLN or TSLN or TLN control) is applied to reset the flip-flop 360. The flip-flops 334 and 342 (FIG. 7) also function to allow the clock pulses CP to be applied to divide the flip-flop 344 via the gates 362 and 364 so that the flip-flop 344 functions as a two-to-one count divider and produces the reduced clock pulses CPl for driving the counter 320. With the found flip-flop 348 in the "reset" state, the gate 370 is enabled to develop an output signal ENA having a repetition rate corresponding to the reduced clock pulses from the flip-flop 344. The ENA signal is applied to the driver gates 305 (FIG. 5) to enable the driver circuits 306 in synchronism with the reduced clock rate. As previously mentioned, the outputs S1-S16 from the scanner counter 320 are also applied to the driver gates 305 via the decoder circuit 304 to produce the sequential scanning outputs from the scanner drivers 306.

The clock pulses are applied to the scanner counter 320 until a current pulse indicating a free path has been detected, at which time a DT signal is applied via a gate 372 (FIG. 7) to "set" the found flip-flop 348. When the flip-flop 348 is "set," the NAND gate 370 is disabled, a STP is applied to the gate 324 (FIG. 8) to prevent further clock pulses CPl from being applied to the scanner counter 320, and a gate 374 is enabled to develop the signal ENB, which, in turn, enables the MD relay gates 310 (FIG. 5) to energize one of the MDl-MDN relays corresponding to the count at which the scanner counter 320 stopped (and corresponding to the free path).

The ENB signal is also applied to the storage counter 322 via gate 376 so that the count in the scanner counter 320 at the end of the first scan is transferred to the storage counter 322 via the lines 1–16 and 1–16. The ENB signal is also applied via a gate 378 to a latching type circuit including the gates 380, 382 and 384 and an inhibit flip-flop 386 that prevents any further transfer of counts to the scanner counter 320 until after the path finding sequence is complete and a general reset signal RES has been received to "reset" the inhibit flip-flop 386. The ENB signal is transmitted through the gates 380 and 382 to provide a short time delay and during the presence of the next clock pulse at terminal CPl a signal is transmitted through the gate 384 to "set" the flip-flop 386. When the flip-flop 386 is set, a signal is transmitted through the gate 390 that inhibits any further transfer of data to the storage counter 322 for the remainder of the same path finding sequence. When the MDA relay of FIG. 5 is actuated in response to the ENB signal, the start signal ST is removed and the flip-flop 334 (FIG. 7) is "reset," which, in turn, resets the found flip-flop 348 via gate 346.

As previously mentioned, the SLN network requires three scans to complete the path finding sequence while the TLN and TSLN networks only require two scans. The second scan for the SLN network essentially proceeds in a manner as previously described above wherein the signal ENB is generated for a second time to reactuate one of the relays MDl-MDN at the end of the second scan, to complete the scan. However, there is no transfer of count from the storage counter 322 into the scanner counter 320 since the flip-flop 386 is "set," inhibiting the gate 354 and thereby preventing the enabling of the gates 358. The third scan of the SLN system and the second scan of the TLN and TSLN system are essentially the same. At the start of the last scan, the start signal ST is applied to the gate 328 and an MKE signal for the scanner control is applied to the gate 392 for conditioning the scanner control circuit for the last scan. The start signal ST sets the pre flip-flop 334, as previously mentioned, conditioning the circuit for a counting sequence, but, however, there is no transfer of the counts from the storage counter 322 into the scanner counter 320 since the flip-flop 360 is still "set," inhibiting the gate 354 and thereby preventing the enabling of gates 358. The flip-flop 334 enables the scanner counter 320 for the next counting sequence by applying an RSC signal to the gates 338 and 340 resetting the scanner counter 320 to a count of zero. The flip-flop 334 also enables the flip-flops 342 and 344 so that the reduced clock pulses CPl are applied to the scanner counter 320 via gates 324 and 326. The scanner counter 320 now applies counting signals to the decoder 304 via lines SDl through SC16 and the driver gates 305 are enabled by the signal ENA, as previously described.

When a current pulse is detected indicating that a path is found, the signal DT "sets," the found flip-flop 348 via the gate 372, however, the MKE signal transmitted through the gate 392 inhibits the gate 374 (preventing the generation of the EMB signal) and enables the gate 394 via a gate 396 to generate a signal ENC. The ENC signal enables the DT relay gates 312 to actuate a corresponding one of the relays DTl-DTN, which, in turn, enables the marking of the free path located by the path finding sequence, and also removes the signal ST. When the marking is complete, a reset signal RES is applied via the gate 398 (FIG. 9) which resets the flip-flop 360.

The scanning system also includes arrangements for providing a signal in the event no path has been found when scanning during the first scan from the count preset into the scanner counter 320 from the storage counter 322 to a count limit of twenty in the scanner counter 320, and also for re-entry in the case of the TLN network. The flip-flops 404 and 406 and the re-entry flip-flop 400 (FIG. 8) are put in a reset condition at the end of a scanning sequence by the RES signal. If a path has been found during the first scan sequence, the flip-flops 404 and 406 are maintained in a "reset" condition by a signal SC12 applied via a gate 401. When the scanner counter 320 reaches a count of twenty from the preset count during the first scan for the first time, and with both the flip-flops 404 and 406 reset, an enabling signal is applied to a gate circuit 408 via a gate 410 to enable the scanner counter 320 for the next counting cycle. In addition, during this first count of twenty, a gate 412 is enabled to apply a signal via a gate 414 to a gate 416 (while both the flip-flops 404 and 406 are reset) to apply a reset signal via the gates 338 and 340 to reset the scanner counter 320 to a count of zero. The output from the gate 414 also "sets" the flip-flop 404 indicating that the scanner counter 320 has exceeded the count of twenty once. The flip-flop 404, when set, inhibits the gates 416 and 408.

When the scanner counter 320 reaches a second count of twenty, all available paths have been scanned during the first scan sequence and no paths are available. At this time, a gate 418 is enabled to produce a no path available NPA signal. The scanner counter 320 is allowed to count through the count of twenty before indicating that no path is available (NPA) so that a complete scan of all available paths is made regardless of the count to which the scanner control 320 was preset at the start of the first scan. This arrangement allows the scanner system to be preset and function as an allotter arrangement to distribute the traffic through the network and still determines when a scan has been completed and no paths are available. In the case of the SLN or TSLN, the path finding sequence ends and an equipment busy signal is sent to the calling party.

In the event that the scanning system is used for locating a path through the TLN with the re-entry circuitry, the output of the gate 418 is connected via the dashed line 419 to "set" the re-entry flip-flop 400. The re-entry flip-flop, when "set," actuates a relay REQ via a gate 422, which, in turn, sends the signal requesting a re-entry path finding cycle. At this time, the ST signal will restart the path finding sequence, and the scanner counter 320 will be reset to zero, as previously mentioned. When the scanner counter 320 reaches the count of twenty, the flip-flop 404 is reset and the flip-flop 406 is set, at which time a gate 424 is enabled to produce a no path available NPA for the TLN system. Since no path is available, and the path finding sequence has been completed, the scanning system is reset by the signal RCS for the next path finding sequence.

SLN AND TSLN CONTROL

Figure 10:
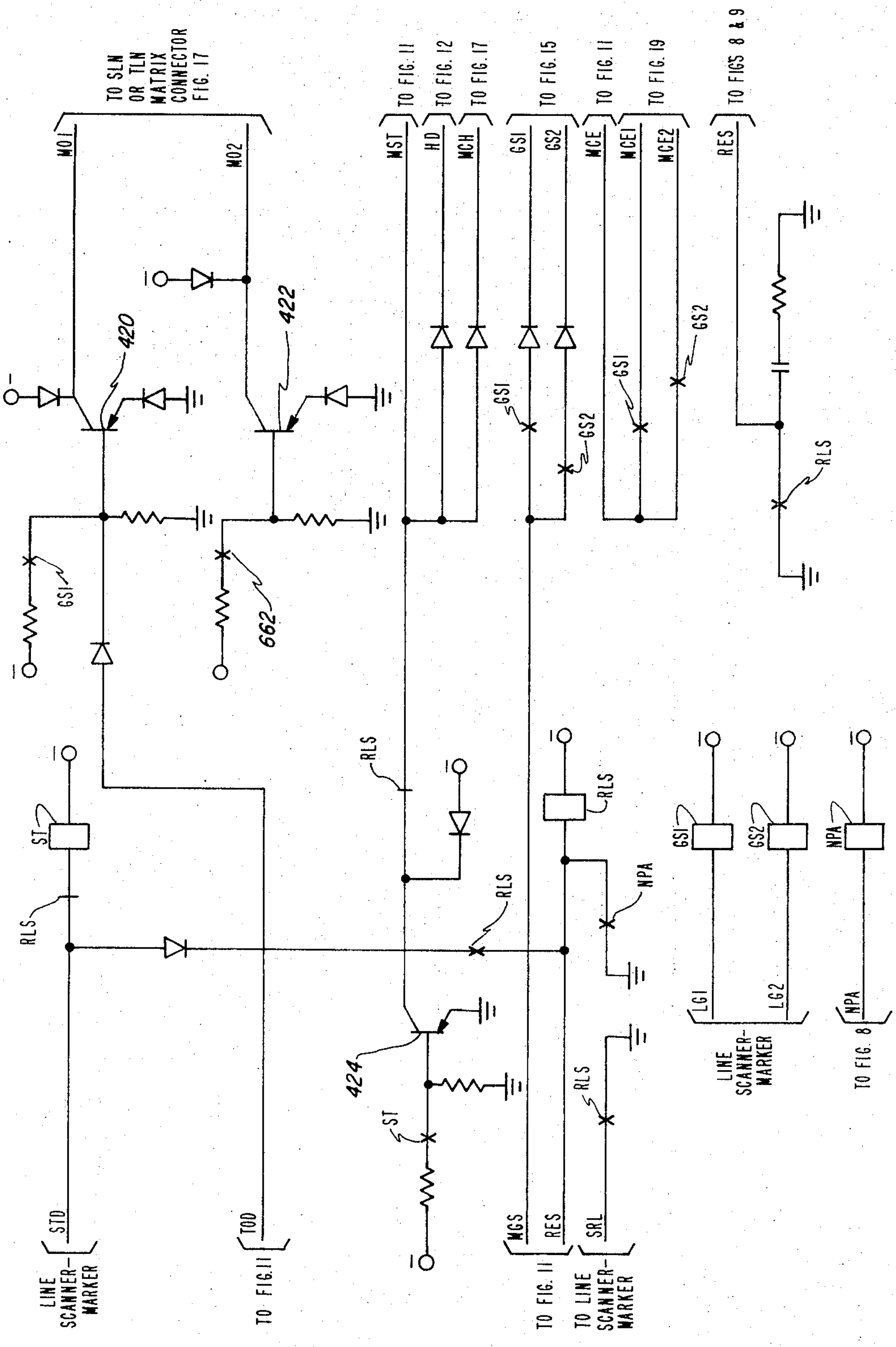
FIGS. 10 and 11 include a schematic diagram of the SLN control and TSLN control of FIG. 1.
Figure 11:
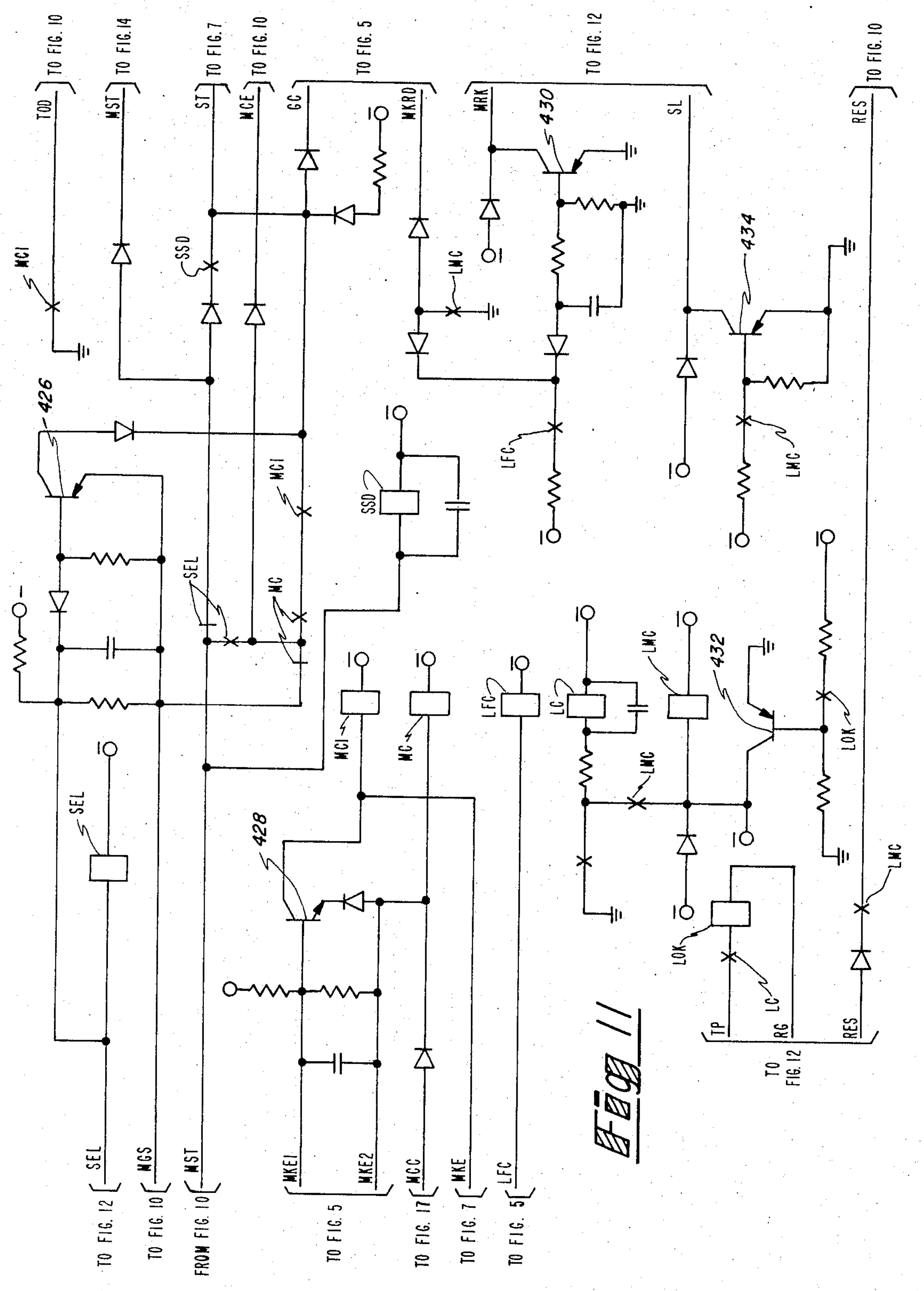

FIGS. 10 and 11 include a schematic diagram of a control system for the TSLN control 70 and the SLN control 42. The control circuit is seized by the line scanner-marker 56 by applying a ground signal to the lead STD, to operate the relay ST. The line scanner-marker 56 also identifies the line group of the calling line circuit (SLN) or trunk circuit (TSLN) by operating relays GS1 or GS2 via leads LG1 or LG2. These relays turn on a transistor 420 or 422 in response to the closure of the contacts GS1 or GS2, respectively, so that a ground signal appears at one of the terminals MO1 or MO2. The ground on one of the terminals MO1 or MO2 actuates a relay C1 in the corresponding matrix connectors (FIG. 17) to complete the mark links in the portion of the network corresponding to the line group indicated by the line marker.

Figure 17:
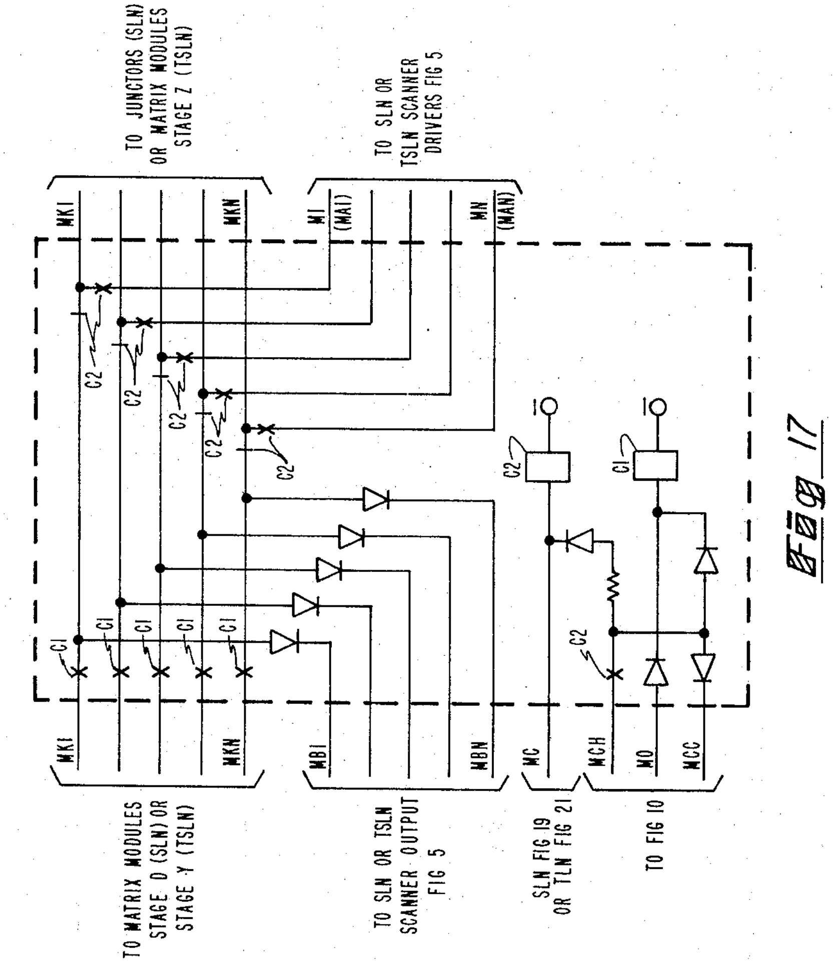
FIG. 17 is a schematic diagram of the SLN and TSLN matrix connector circuits of FIGS. 2 and 3.

The operation of the control circuit of FIGS. 10 and 11 will first be explained with regards to the SLN network. When the ST relay operates the transistor 424 is rendered conductive to apply a ground signal on the lead MST. The MST ground signal is transmitted via the circuit of FIG. 11 to operate relays RS1 and RS2 in the register selector (FIG. 14) to condition the circuit for the first path finding sequence. At the same time, the ground signal is also applied to the line MCH, partially completing a hold path for a relay C2 (not yet operated) in the matrix connector (FIG. 17). The ground on the lead MST also actuates the relay SSD (FIG. 11) after an approximate 3 millisecond delay. When the relay SSD operates, ground is applied to the ST lead to the scanner circuit (FIG. 7) and starts the register scan (first scan).

Figure 19:
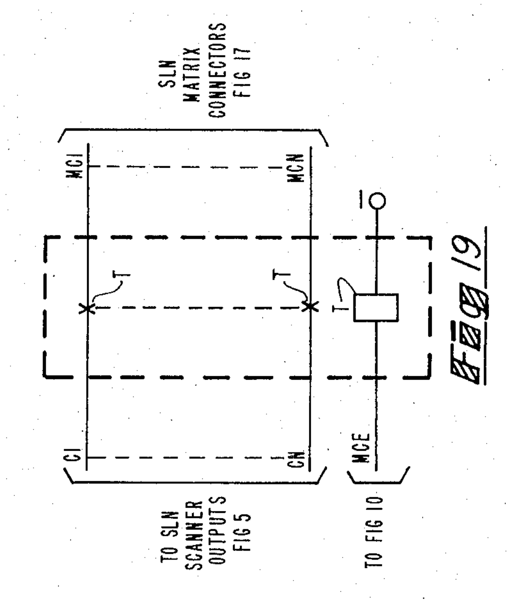
FIG. 19 includes a schematic diagram of the SLN matrix connector enable circuit of FIG. 2.

When the current detector (FIG. 6) detects a free path, the scanning procedure is stopped and a register is seized through the detected path. The seized register operates the SEL relay (FIG. 11) via the lead SEL. When the SEL relay is operated, ground is removed from the ST lead, releasing the scanner. The SEL relay also applies ground to the lead MSG (FIG. 11) and via one of the group select relay contacts GS1 or GS2 (FIG. 10) to operate relay K1 and K2 in the proper SLN matrix group selector (FIG. 15) via leads GS1 or GS2. At the same time, the SEL relay releases the scanner, it also operates a relay in the proper SLN matrix connector enable by applying a ground on the lead MCE and through one of the GS1 or GS2 contacts to leads MCE1 or MCE2 to a corresponding matrix connector enable circuit (FIG. 19). When the SEL relay operates, a delay circuit, connected to the base of a transistor 426, is completed so that after a delay of 3 milliseconds, the transistor 426 is rendered conductive and restarts the scanning cycle via the lead ST.

The scanner stops when it has detected a free path. The matrix scanner output now operates the proper matrix connector via the operated matrix connector enable circuit and the relay MDA (FIG. 5) is operated by the ENB signal to interconnect the leads MKE1 or MKE2. The operated matrix connector in turn applies a signal to the lead MCC to operate the relay MC. This completes the second SLN scan.

During the third scan, the operated relay MC disables the transistor 426, removing the ground from the lead ST and releasing the scanner. Releasing the scanner removes the short circuit across the leads MKE1 and MKE2. The transistor 428 is now rendered conductive to operate the relay MC1, which, in turn, applies ground from the MST lead via contacts MC and contacts MC1 to the ST lead to start the scanner and also applies ground to the GC lead to the scanner mark contacts MD1-1 through MDN-1 (FIG. 5). The scanner stops when the completed path has been found, and a DTA-2 contact (FIG. 5) applies ground to the lead LFC to actuate a line finding complete relay LFC, while the contacts DTA1 turns the transistor 425 on.

Figure 12:
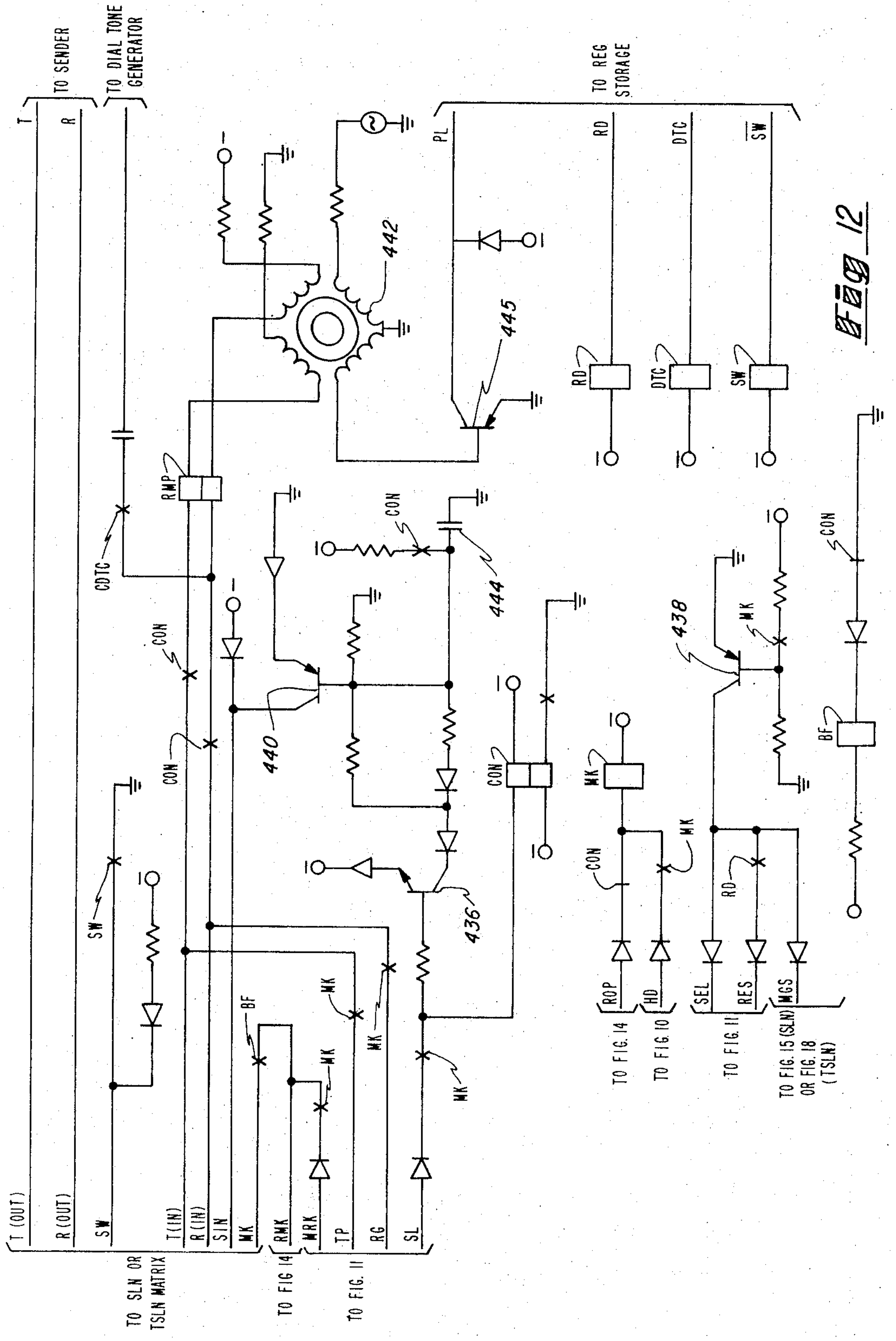
FIG. 12 is a schematic diagram of the dial pulse acceptor (DPA) included in the local registers and trunk registers of FIG. 1.

When the relay LFC is operated it forward biases the transistor 430 to apply ground to the MRK lead which applies ground to the mark lead in the register DPA (FIG. 12). The LFC relay, when operated, also applied ground to an LC relay which is operated after an approximate 4 millisecond delay to connect a relay LOK across the tip and ring line, lines TP and RG, in the register DPA (FIG. 12) to check to see if the metallic connection through the tip and ring lines is complete. If the metallic connection between the called party and the register DPA is complete, the LOK relay is operated to forward bias a transistor 432 which operates the relay LMC, which, in turn, is sealed in by its own contacts. When the relay LMC operates, the transistor 434 is forward biased to apply ground on the sleeve lead SL in the register DPA. The junctor 36 now applies a ground to the sleeve lead to hold the connection. The LMC relay applies a ground to the base of the transistor 430 removing the mark ground from the lead MRK and also applies ground to the lead MKRD to disable the mark potential in the scanner output contacts DT1-2 through DTN-2 (FIG. 5).

If the matrix scanner does not locate a free path during the first scan, a no path available signal NPA is transmitted from the scanner system (FIG. 8) to operate a relay NPA (FIG. 10). The NPA relay operates the release relay RLS, which, in turn, sends a release signal to the line scanner-marker, and the scanner circuit releases the control circuit. The RLS relay is also operated via the LMC contacts (FIG. 11) by a signal RES from the register DPA.

When the circuits of FIGS. 10 and 11 are used for the TSLN control, the control is seized by an incoming trunk scanner-marker 62 (FIG. 1) by placing ground on the lead STD to operate the relay ST. The leads MO1 and MO2 and relays GS1 and GS2 function as before. The first scan (register scan) is similar to that described above with regards to the SLN application. When a register has been seized it operates the relay SEL and seizes the corresponding matrix connector 242 (FIG. 3). The operated matrix connector operates the relay MC via lead MCC and the second TSLN scan and completion is carried out in a manner identified to the third scan of the SLN application as described above.

REGISTER

FIG. 12 is a schematic diagram of a register dial pulse acceptor in the local registers 38 and trunk registers 66. The busy-free relay BF is normally operates so that the TSLN or SLN control has access to the SLN or TSLN matrix via the lead RMK. The relay BF is released whenever the register becomes busy, thereby presenting an open circuit to the scan pulses applied thereto from the driver circuits 206 of FIG. 5. As previously mentioned, when the SLN or TSLN control has been seized, it operates a register selector (212, FIG. 2, 246, FIG. 3) completing the connections between the registers and the scanner drivers, and starts the first scan (register scan). The scan pulses from the drivers 306 of FIG. 5 are routed via the register selector through the lead RMK (when free) via the BF contacts to the mark lead MK extending to the SLN or TSLN network. When a free path has been detected, the scanner circuit of FIG. 5 operates one of the MD1-MDN relays and applies a ground on the lead ROP via the register selector (FIG. 4) to operate the relay MK. The contacts of the relay MK, when operated: (1) completes a hold path for itself via a lead HD extending from the control circuit of FIG. 10; (2) connects the base of the transistor 436 to the lead SL to receive a ground connection from FIG. 11; (3) connects the lead T(in) and R(in) from the SLN or TSLN network to the TP and RG leads extending to the LOK relay of FIG. 11, and forward biases the transistor 438.

When the transistor 438 is conductive, it applies a ground on the lead SEL signalling the seizure of the register to the control circuit of FIG. 11. The transistor 438 also applies ground to the lead MGS to operate the matrix selector. The SLN control now releases the register selector and initiates the second scan (TSLN) or second and third scan (SLN). Upon completing of the scanning process, a ground signal is applied to the lead MRK from the circuit of FIG. 11 which is extending via lead MK to the mark leads of the SLN or TSLN matrices to operate the matrix crosspoints. When the crosspoints in the path have been operated, a ground is applied on the lead SL (from FIG. 11), which, in turn, renders the transistors 436 and 440 conductive to apply ground on the lead S(in) to energize the hold or sleeve relays in the SLN or TSLN matrix relays and seizes the junctor associated with the operated path. If the call originates from a line circuit, this ground on S(in) also holds the LLN matrix relay in the path and also operates the matrix guard relays. If the call originates from an incoming trunk, this ground operates the cutoff relay in the trunk circuit.

The ground on the lead SL also operates a relay CON. When the relay CON operates, its contacts: (1) prepares a hold path to itself via the contacts of relay RD; (2) connects the leads T(in) and R(in) to the magnetic core sensor 442 via the relay RMP; (3) provides an alternate drive base for the transistor 440; (4) disconnects the relay MK from the lead ROP, and (5) releases the busy-free relay BF.

The dial digits are applied to the magnetic core sensor and which detects the off hook signal and also detects dial pulses, and transmits them to the register storage via a transistor 445 and a lead PL. When the register storage detects the off hook signal, it applies ground on leads RD and DTC operating the relays RD and DTC, respectively. The contacts of the relay RD, when operated, closes the hold path for the relay CON, and extends the ground from the transistor 438 to the lead RES indicating that the register has been seized and the connection complete so that the TSLN or SLN control now releases by removing ground from the lead HD, which, in turn, releases the relay MK. The relay DTC, when operated, applies dial tone to the subscriber loop.

Upon completion of dialing, the register storage extends ground signal to the lead SW to operate the relay SW, which, in turn, applies ground to lead SW. This ground is routed via the SLN or TSLN switching networks to the junctor, which, extends the ground to the junctor control to signal the start of the termination of the connection.

When the termination process has been completed, the junctor control initiates release of all circuits and simultaneously operates a relay in the junctor that switches the subscriber loop from the SLN or TSLN network to the TLN network. In addition, when the register receives a release signal from the number translator, it causes the release of the relay SW. At this time, the connection to the magnetic core sensor is broken to switch the sensor to the "on hook" state causing the release of the relay RD from the register storage, which, in turn, releases the relay CON. The released CON enables a liming circuit (discharge of capacitor 444) which, in turn, releases the sleeve ground on S(in) 20 milliseconds later. Releasing the relay CON also reoperates the relay BF.

In the event of a trunk call termination, the subscriber digits, received by the register also appear in the core translator. When it recognizes a trunk call, it causes the operation of the relay SW and starts the termination process as previously mentioned. When the termination process has been completed, the junctor control operates a trunk relay and causes it to switch through the leads T(out) and R(out) to the outgoing trunk via the TLN network. The subscriber loop is still being held via leads T(in) and R(in).

When a code translator causes the operation of the relay SW, it also instructs the register to seize a sender, and connects the sender via leads T and R to the outgoing trunk via the TSLN network, and junctor and the TLN network. This is the outpulsing path for the sender.

When outpulsing has been completed, the register instructs the sender to release the relay SW removing the ground from the lead SW to signal the junctor to switch the incoming loop from the register to the trunk via the path used previously for outpulsing. This switchover breaks the loop for the magnetic core sensor and a release of the register is accomplished.

TLN CONNECTION WITHOUT RE-ENTRY

Figure 13:
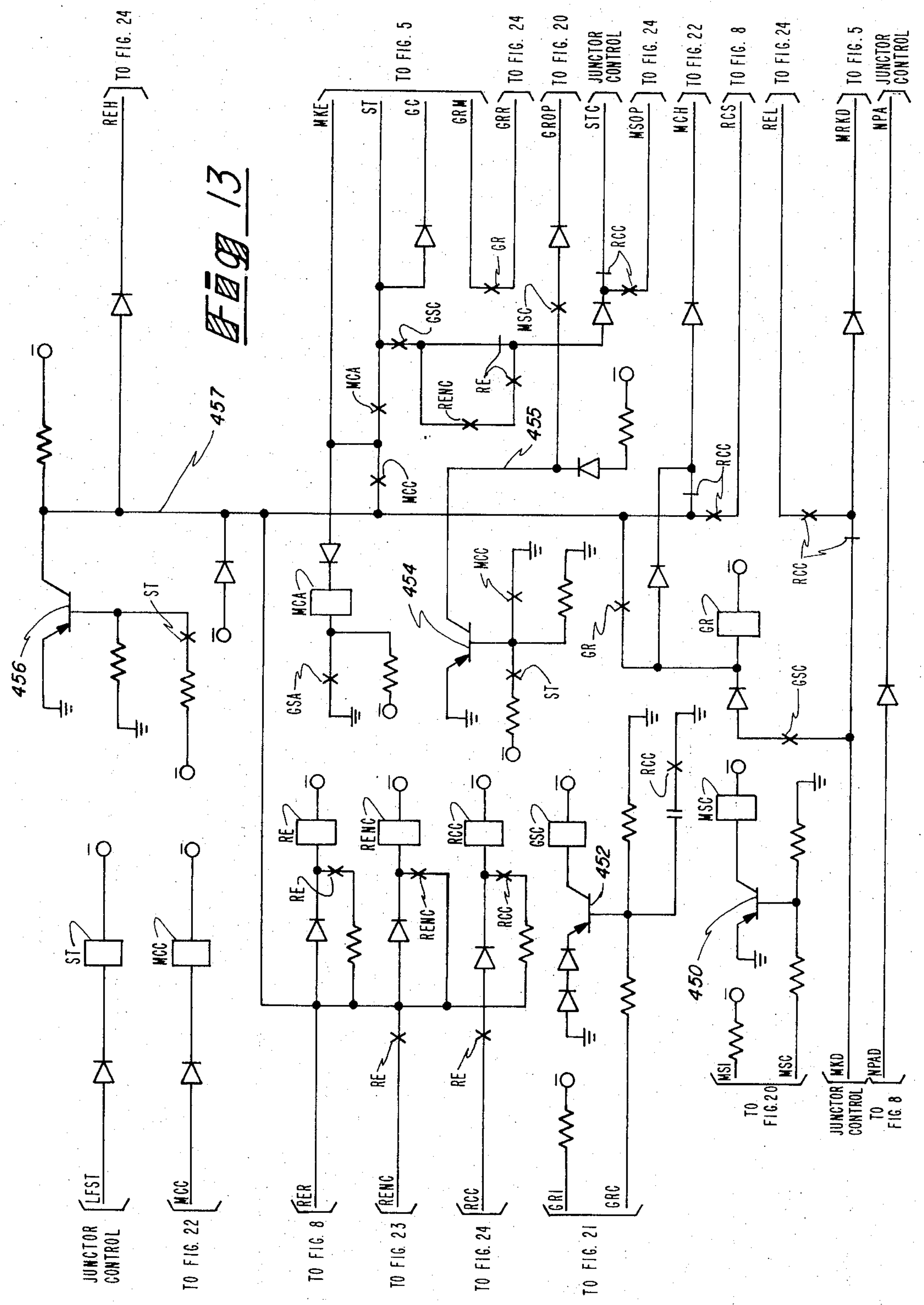
FIG. 13 is a schematic diagram of the TLN control of FIG. 1.

The TLN control of FIG. 13 is seized by the junctor control 84 by applying a ground on the lead LFST to operate the relay ST. When the relay ST is operated, the transistors 454 and 456 are rendered conductive to apply ground to the lines 455 and 457, respectively. A ground signal is now applied to the lead STC, which is routed via the junctor control 84 to the junctor involved in the connection. The junctor now operates the proper matrix selector 270 (FIG. 4A). The operated matrix selector interconnects the leads MSl and MSC to render a transistor 450 conductive and operate the relay MSC. Ground is now applied from the lead 455 to the lead GROP via contacts MSC to operate all the matrix connectors 268 in the grid and the grid selector 274 via the matrix selector circuit. The operated grid selector prepares a path to all the matrix connectors 268 in the corresponding grid for selection by the path finding sequence. The operated grid selector 274 closes the loop between leads GR1 and GRC to render a transistor 452 conductive and operate the relay GSC. Ground is now applied from the lead 455 via contacts RE and GSC to the ST lead to start the matrix scanner. Scanning pulses are now applied via the operated matrix selector 270 to scan the output links of the stage D matrix 260 for a free path between the links and a marked circuit at the other end of the TLN network.

When a free path has been detected, the current detector 308 (FIG. 5) stops the scanning sequence and the relay MDA is operated and one of the relays MD1 and MDN as operated corresponding to the free path selects the proper matrix connector 268 via the grid selector 274. The operated matrix connector now operates the relay MCC (FIG. 13) via the lead MCC. When the relay MCC operates, ground is applied to the base of the transistor 454, cutting off the transistor and removing the start scan signal from the lead ST. The ground on the lead MCH is removed and the only matrix connector that remains operated is the one selected by the scanner. The matrix selector and the grid selector are now released, thereby releasing relays GSC and MSC, which, in turn, prepare the TLN control for the second scan operation. When the relay GSC is released, a relay MCA is operated from the ground on line 457, which, in turn, applies a start second scan signal to the lead ST to initiate the second scanning sequence. Scanning pulses are now applied to the selected matrix connector 268. When a free path through the matrix connector 268 is found, the current detector 308 again stops the scanner circuit, the relay DTA and the corresponding DT1-DTN relay of FIG. 5 are operated to complete circuits to the mark relay in the free path. The junctor control 84 now makes a continuity check through the tip and ring connection. If the continuity check is successful, the junctor control releases, removing the ground from the lead LFST deactivating the relay ST. When the relay ST is deactivated, the transistor 456 is rendered non-conductive and the TLN control is now released.

TLN CONNECTION WITH RE-ENTRY

IF the scanner does not detect a free path during its first scan of the stage D, the TLN control becomes conditioned for an overflow mode (re-entry) of operation at the time the last outlet from the stage D matrix is scanned by operating the re-entry enable circuit 279 (FIG. 4B). As previously mentioned, during the first scan (stage D scan), the transistors 454 and 456 are conductive and the ground from the lead 455 is applied via leads RE and GSC to the lead ST. When a count corresponding to the last link from the selected stage E matrix module is reached, the scanner counter circuit (FIG. 8) applies a ground to the lead RER to operate the relay RE, which, in turn, removes the scanner start ground from the lead ST. The RER ground signal is also applied to the re-entry marking enable circuit 280 (FIG. 4) to condition all the matrix connectors 268 in all the grids for the re-entry path finding sequence. The scanner circuit of FIG. 8 also operates a re-entry request relay REQ which, in turn, operates the re-entry enable circuit 279. When the re-entry enable circuit 279 is operated, all the re-entry connectors 267 in all the TLN grids are conditioned for the path finding sequence. When the relay RE operates, it also closes an operate path to the relay RENC in response to the operation re-entry enable circuit (FIG. 23) via lead RENC. When the relay RENC operates, ground is again applied to the lead ST via the contacts RENC to restart the scan of the same stage D matrix output links for the second time. If a free path is found during the second scan of the D stage without using re-entry, the scan of the stage E matrix will be carried out as previously described and the connection completed without re-entry. If the scanner again reaches the last link connected to the stage D matrix module (allotted for re-entry), the re-entry mode of operation will commence (if a free path through re-entry was detected). The corresponding re-entry connector 276 (FIG. 4B) is now seized and a ground signal will be applied from the re-entry connector to the lead RCC to operate the relay RCC. The operated relay RCC removes the re-entry request signal by applying ground on the lead RCS to reset the re-entry request flip-flop 400 (FIG. 8) and after the crosspoints in the D and E stages are operated removes the matrix connector hold ground from the lead MCH to release the matrix connector of the network grid previously scanned.

The relay MCC (previously held operated by the operated matrix connector) is now released. The matrix selector 270 (FIG. 4B) in the re-entry grid is now operated from a ground on the lead MSOP via the TLN re-entry connector 276 corresponding in the selected stage D re-entry path. When the re-entry path matrix selector operates, the relays MSC and GSC are reoperated and the re-entry grid is scanned in a manner as previously described. In addition, when the GSC relay operates in the re-entry mode of operation, the relay GR is operated via lead MKD. When a link has been selected in the stage D re-entry module, the matrix scanner output circuit operates the proper matrix connector circuit and the operated connector circuit actuates the relay MCC. Now the start scan is removed from the lead ST, and the matrix selector, the grid selector and the relays GSC and MSC are released. When the relay GSC releases after the first scan, the relay MCA operates generating the matrix start scan signal ST (the second time in the re-entry scan) and the links of the E stage in the re-entry grid are now scanned. When a free link has been detected, the current detector circuit stops the scanner and the mark leads of the crosspoint relays of the stages D and E in the re-entry grid are operated by a ground supplied via leads GRR and GRM. Junctor control now makes a continuity check on the tip and ring connections, and if the continuity check is successful, the sleeve leads in the matrix stages are operated and ground is applied to lead REL and is forwarded via lead MRKD. This releases the mark connections from the matrix scanner. The TLN control is now released by removing the signal on the lead LFST.

If the matrix scanner does not detect a free path when scanning the outputs of the D stage with the re-entry enable circuit operated, ground appears on the lead NPAD, which, in turn, is transmitted via lead NPA to the junctor control indicating no path is available. The junctor control now forwards this no path available signal to the junctor and releases the TSLN control by removing the ground from the lead LFST.

REGISTER SELECTOR

Figure 14:
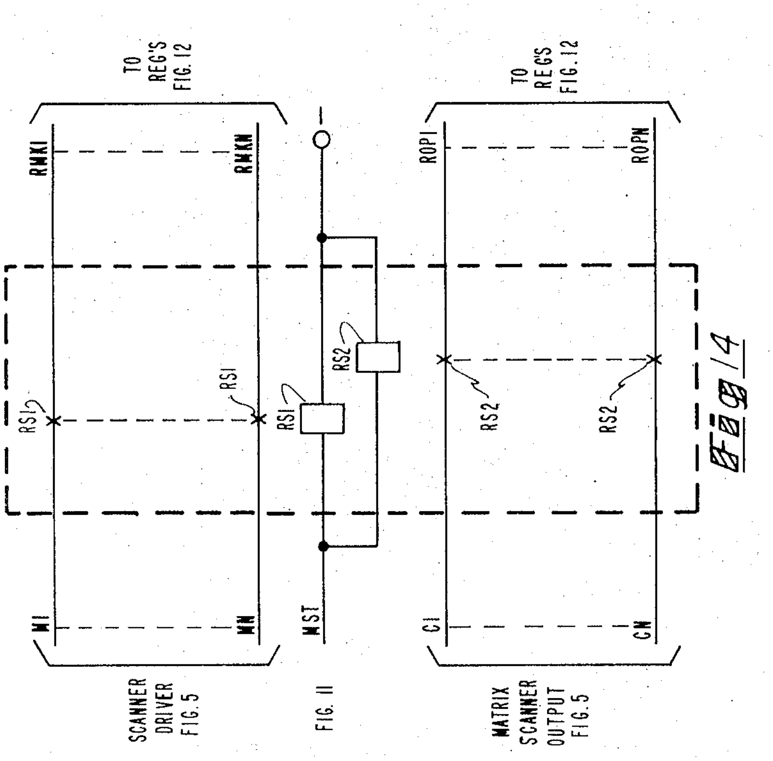
FIG. 14 is a schematic diagram of the register selector circuits of FIGS. 2 and 3.

FIG. 14 includes an electrical schematic diagram of the register selector circuit for use in the SLN and TSLN networks. The relays RS1 and RS2 are operated by applying ground to the lead MST from the SLN or TSLN control (FIG. 11). The scan pulses from the driver circuit 306 (FIG. 5) are applied via the leads M1-MN and the relay contacts RS1 to the RMK leads of the various register circuits (FIG. 12). The leads C1-CN are connected to the scanner output circuit C1-CN (FIG. 5) and through the contacts RS-2 to the ROP1-ROPN leads of the plurality of registers.

SLN MATRIX GROUP SELECTOR

Figure 15:
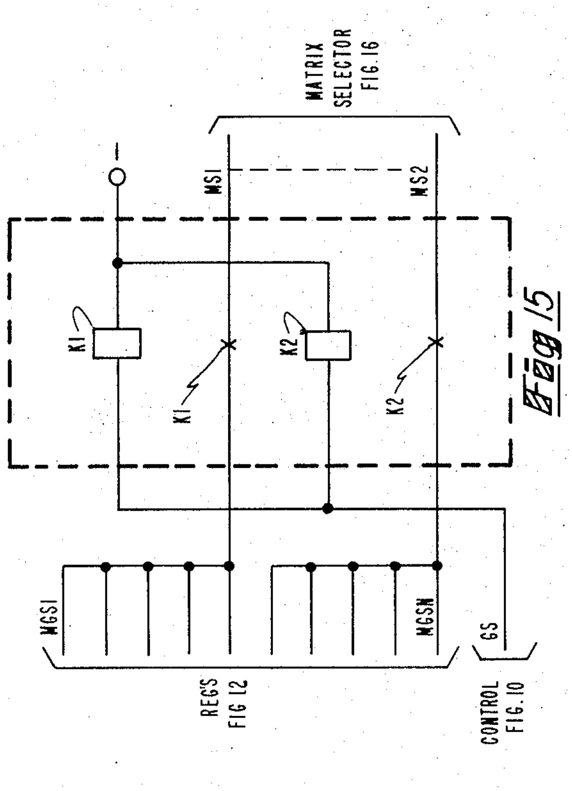
FIG. 15 is a schematic diagram of the SLN matrix group selector circuit of FIG. 2.

FIG. 15 includes an electrical schematic diagram of the SLN matrix group selector. The relays K1 and K2 are actuated by a ground signal on the leads GS from the SLN control of FIG. 10. The MGS1-MGSN leads from the plurality of registers (FIG. 12) are connected in groups to a common lead MS1 or MS2 through the contacts K1 or K2 to the matrix selector of FIG. 16.

SLN MATRIX SELECTOR

Figure 16:
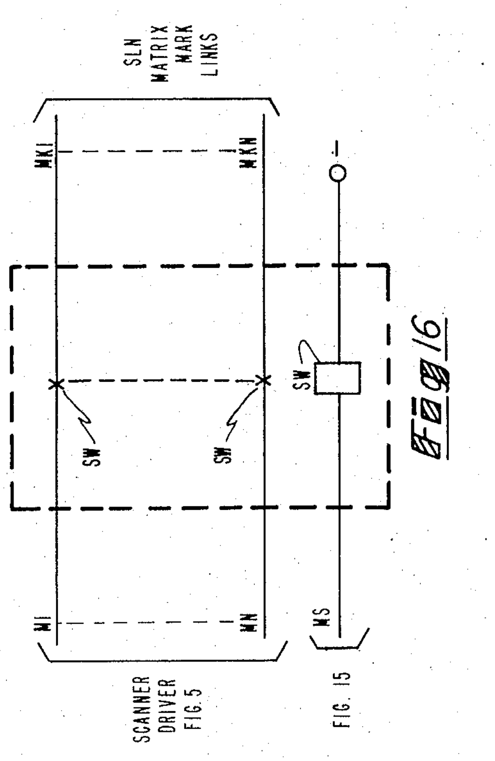
FIG. 16 is a schematic diagram of the SLN matrix selector circuit of FIG. 2.

FIG. 16 includes a schematic diagram of the SLN matrix selector circuit. The leads MK1-MKN are connected to the individual one of the mark links extending between the stages S and P in the SLN network. A relay SW is actuated via a lead MS from the one group selector leads MS1 or MS2 of FIG. 15. The output of the scanner drivers 206 is connected to the leads M1-MN to apply scanning pulses through the contacts SW to the mark lead links.

MATRIX CONNECTOR - SLN APPLICATION

The matrix connector of FIG. 17, when used in the SLN application, is connected in series with the mark leads between the local junctors 206 (FIG. 2) and the stage P matrix module 202. In an idle state (between path finding sequences) these mark leads are broken by the relay C1 contacts.

When the SLN control 42 is seized, it applies a ground on lead MO to operate the relay C1 in all the matrix connectors in the group in which the originating line circuit is located. The relay C1 switches through the mark leads and conditions the matrix connectors for the path finding sequence. When the first and second scanning steps are completed, the matrix connector through which the free path has been found is identified and a ground signal is applied to lead MC from the SLN matrix connector enable 216 (FIG. 19) to operate the relay C2. The relay C2 is held operated by hold ground applied by the SLN control on lead MCH via the closed contacts C2, which also keeps the relay C1 operated. The ground on lead MO in all the matrix connectors is now removed by the SLN control which, in turn, releases the relys C1 in all the matrix connectors except in the selected matrix connector in which the relay C2 was previously operated. A ground signal is applied to the lead MCC indicating to the SLN control that the matrix connector has been seized to allow the third SLN scan sequence. The operated relay C2 breaks the mark lead connections through the matrix connectors and connects the mark leads MK1-MKN extending to the junctor circuits to the leads M1-MN to receive scanning pulses from the scanner drivers of FIG. 5.

During this third scan, ground pulses from scanner drivers are sequentially applied to the leads M1-MN and are routed via their respective MK1-MKN leads to the mark leads of various junctor circuits connected to the selected matrix connector circuit. When the free junctor is identified, the relay DTA (FIG. 5) operates to apply a ground signal on the corresponding one of the leads MA1-MAN and resistance battery to one of the corresponding leads MB1-MBN. The ground on the lead MA1-MAN seizes the free junctor circuit and operates the LLN matrix crosspoints. The resistance battery on the lead MB1-MBN operates the SLN matrix crosspoints. After a tip and ring connection has been established and checked and after the sleeve connections are completed, the SLN connector is released by removing the ground on lead MCH.

MATRIX CONNECTOR - TSLN APPLICATION

The matrix connectors in the TSLN matrix are connected in series with the mark leads between the stage Y guard relay contacts 240 and the stage Z matrix modules 232. In the idle state these mark leads are broken by relay contacts C1.

When an incoming trunk marker 62 seizes the TSLN control 70, it also applies a GRS signal to enable the TSLN grid selector 248 (FIG. 18) in which the incoming trunk is located. A ground signal is applied from the TSLN control to the lead MO in all the matrix connectors in the selected grid and operates the relay C1 to switch through the mark leads.

After the register scan is complete, the matrix connector through which the free path has been detected is identified and its relay C2 is operated by applying a ground to the lead MC via the grid selector and the relays C2 and C1 are now held operated by a ground hold on the lead MCH. The ground on the lead MO is removed to release all the C1 relays in the matrix connectors in the grid with the exception of the matrix connections including operated C2 relay. The matrix connector in the TSLN control now functions in identical manner as previously set forth above with respect to the SLN application with the exception that the relay C1 remains operated until released by the incoming trunk marker.

TSLN GRID SELECTOR

Figure 18:
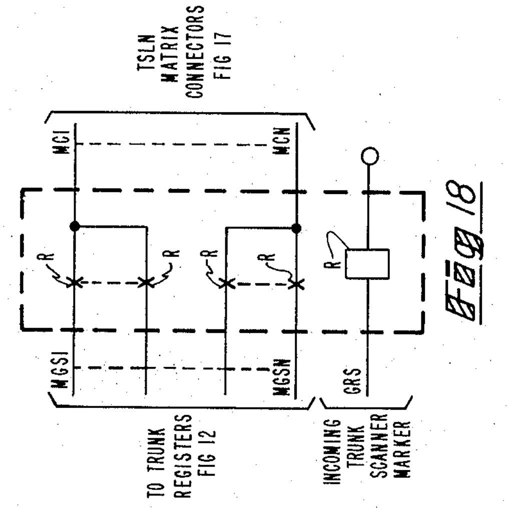
FIG. 18 includes a schematic diagram of the TSLN grid selector circuit of FIG. 3.

The TSLN grid selector of FIG. 18 enables the path selection to one TSLN grid as determined by the incoming trunk marker 62. One grid selector circuit is required per TSLN grid. The circuit is operated by a ground on the lead GRS from the incoming trunk scanner-marker 62. A plurality of register circuits are served by each stage Z matrix module. Therefore, the MGS leads of a plurality of registers are combined via the relay R contacts into one MC lead. The MC1-MCN leads are connected to the various matrix connectors so that the relay C2 in the proper matrix connector is operated as determined by the seized register.

SLN MATRIX CONNECTOR ENABLE

The connector enable circuit of FIG. 19 enables the operation of the SLN matrix connectors of the line group indicated by the line scanner-marker 56 and depending upon the line group in which the originating line circuit is located. The SLN control applies a ground on the lead MCE to operate the relay T which connects the leads C1-CN from the SLN scanner outputs of FIG. 5 to the MC1-MCN contacts connected to the various matrix connectors in the group. The SLN control is now enabled to operate a relay C2 in the proper SLN matrix connector in the proper group.

TLN MATRIX SELECTOR

Figure 20:
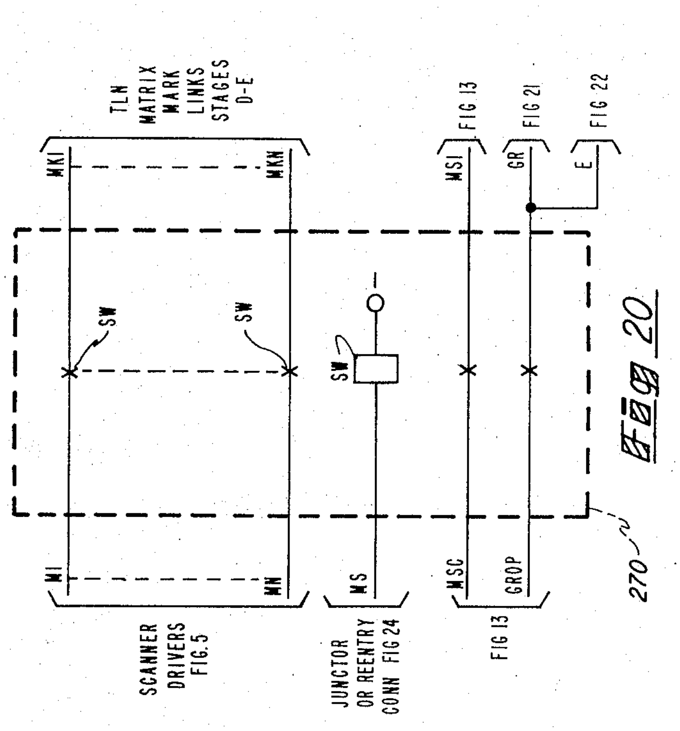
FIG. 20 is a schematic diagram of the TLN matrix selector circuits of FIGS. 4A and 4B.

FIG. 20 includes a schematic diagram of the TLN matrix selector circuit 274 of FIG. 4A. A separate matrix selector circuit is provided for each of the stage D matrix modules 260. The leads MK1-MKN are connected to individual ones of the mark links extending from a corresponding stage D module. A relay SW is actuated by a ground to the lead MS Via the junctor control 84 and a junctor circuit 36 or 64 (or a re-entry connector 276 in case of re-entry). The junctor circuit or re-entry connector identifies the stage D module and its connected matrix selector. The lead MS1 is switched through to the lead MSC indicating to the TLN control that the TLN matrix selector has been operated. The lead GROP is switched through to the head GR serving to operate a matrix grid selector circuit 274 and the relay C1 in all the matrix connectors 268 (FIG. 22) in the same TLN grid. The output circuits of the scanner drivers 206 (FIG. 5) are connected to the leads M1-MN to apply scanning pulses through the contacts SW to the various stage D mark links.

TLN GRID SELECTOR

Figure 23:
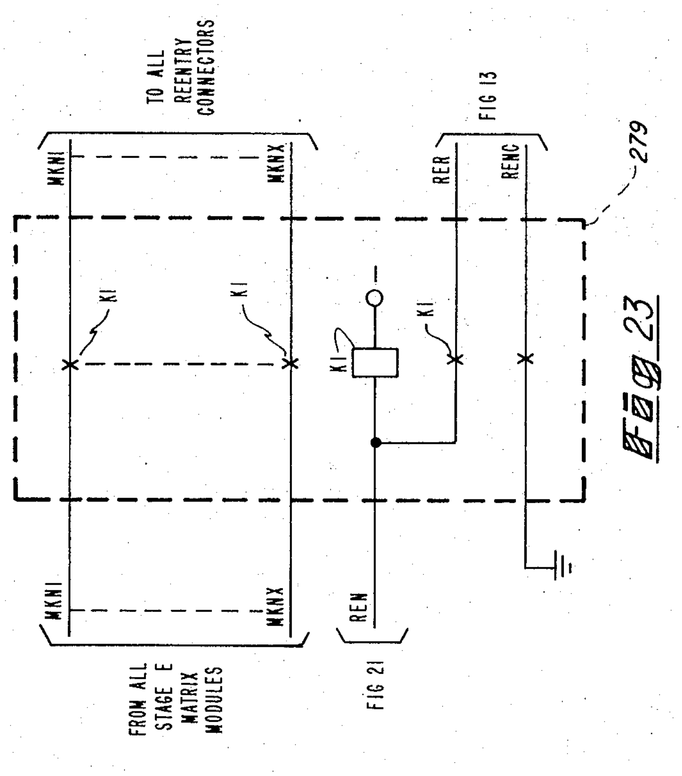
FIG. 23 is a schematic diagram of the re-entry enable circuit of FIG. 4B.
Figure 21:
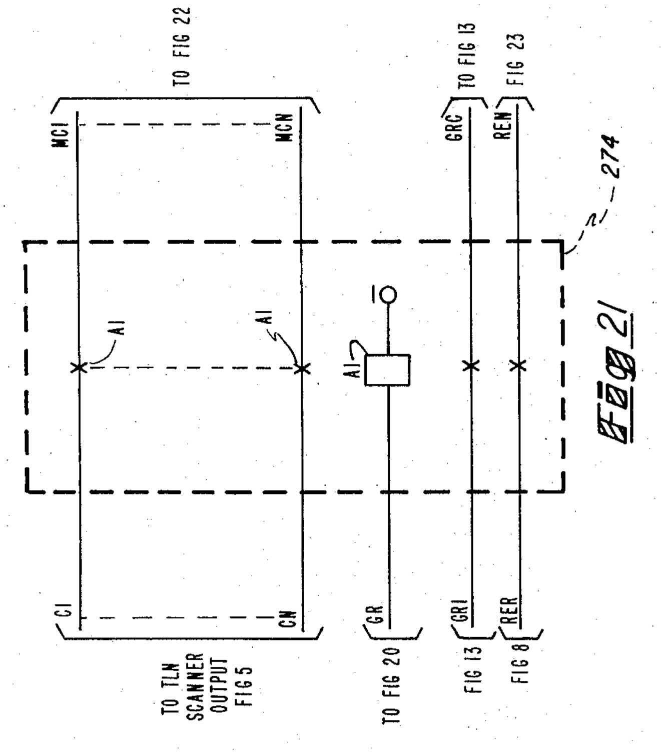
FIG. 21 includes a schematic diagram of the TLN grid selector circuit of FIG. 4A.

FIG. 21 includes a schematic of the TLN grid selector 274 (FIG. 4A). The purpose of the circuit is to identify a TLN matrix connector 268 located in the free path through the TLN network. The grid selector circuit serves one TLN grid. The TLN grid selector is seized by ground applied to the lead GR from any of the plurality of TLN matrix selectors 270 included within the same grid as the grid selector. When the grid selector is seized, the leads GR1 and GRC are switched through indicating to the TLN control 70 that the TLN grid selector has been seized. The lead RER and REN are also switched through, and if re-entry is requested, the TLN control applies ground on RER for operating the relay K1 in the re-entry enable circuit (FIG. 23). The leads C1-CN are connected to the TLN scanner outputs (FIG. 5). The leads MC1-MCN are connected to operate the relay C2 (FIG. 22) in separate ones of the matrix connectors 268 in the same grid. At the end of the D stage scan, ground is applied by the TLN scanner outputs on one of the leads C1-CN (depending upon where the scanner stopped) to operate the relay C2 to the corresponding one of the TLN matrix connectors included in the free path. The TLN grid selector is released by the release of the TLN matrix selector 270 before the start of the stage E scan.

TLN MATRIX CONNECTOR

Figure 22:
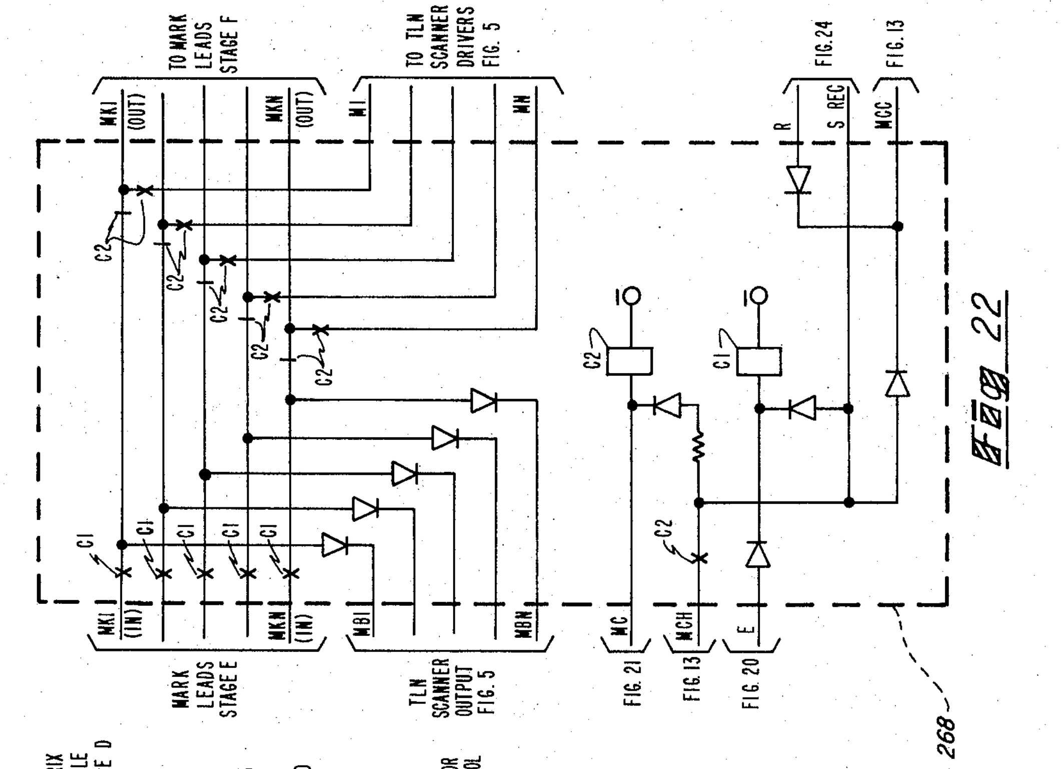
FIG. 22 is a schematic diagram of the TLN matrix connector circuit of FIGS. 4A and 4B.

FIG. 22 includes a schematic diagram of the TLN matrix connector 268 (FIG. 4A). In the TLN matrix connector, lines MK1-MKN (in) and MK1-MKN(out), are connected in series with the mark leads between corresponding matrix modules in stages E and F. If the TLN network includes a re-entry arrangement, the last lead MKN(out) (and its corresponding sleeve lead) will be connected to the re-entry connector 276 via the re-entry enable circuit 279 (FIG. 4B). In the idle state (between path finding sequences), these leads are broken by the relay C1 contacts.

When the TLN control 70 is seized, it applies a ground on the lead E via the matrix selector 270 to operate the relay C1 in all the matrix connectors in the grid. The relays C1 switch through the mark leads and conditions the matrix connectors for the path finding sequence. When the first scanning step is completed, the matrix connector through which the free path has been found is identified and a ground signal is applied to the lead MC via the TLN grid selector (FIG. 21) to operate the relay C2. The relay C2 is held operated by a hold ground applied by the TLN control 70 to the lead MCH via the closed contacts C2, which also keeps relay C1 operated. The ground on the lead E in all the matrix connectors is now removed by the TLN control, which, in turn, releases all the C1 relays in all the matrix connectors except in the selected matrix connector in which the relay C2 was previously operated. In this operated condition, ground is applied to the lead MCC indicating to the TLN control that the matrix connector has been seized to allow the second TLN scan sequence (stage E). The operated relay C2 breaks the mark lead connections through the matrix connector and connects the mark leads MK1-MKN of the stage F matrix module to the leads M1-MN to receive scanning pulses from the TLN drivers of FIG. 5.

During the second TLN scan, ground pulses from the scanner drivers are sequentially applied to the leads M1-MN and are routed via the respective MK1-MKN leads to the mark leads of the connected stage F matrix module. At the end of the second scan, two conditions are possible. A path can be found without the re-entry condition, and in such case, resistance battery from the scanner circuit (FIG. 5) is applied to one of the leads MB1-MBN while a ground signal (MA1-MAN) is applied to one of the leads M1-MN. The ground on leads M1-MN operates the stage F crosspoints and the LLN crosspoints. The resistance battery on the lead MB1-MBN operates the stage D and stage E matrix crosspoints. After a tip and ring connection has been established and checked, and after the sleeve connections are completed, the TLN connector is released by removing the ground signal from the lead MCH.

In the event that no path was found, the TLN system will revert to a re-entry approach. In such case, the lead REC supplies operate ground to the re-entry connector (FIG. 24), and the re-entry scan will be initiated. If a path was found via the re-entry path, there will be resistance battery applied to one of the leads MB1-MBN to pick up the stage D and E crosspoints, but no ground will appear on the leads MN. The sleeve lead will be grounded to hold the crosspoints. The TLN matrix connector is released when the ground on the lead MCH is removed by the TLN control.

RE-ENTRY ENABLE

FIG. 23 includes a schematic diagram of the re-entry enable circuit 279. The purpose of this circuit is to enable the TLN control 70 to detect a free path through the TLN network via another grid (or another stage D in the same grid) if during the first scan of the stage D a free path has not been detected. The re-entry arrangement provides additional path in the event of heavy traffic conditions through the TLN network.

One re-entry enable circuit serves one grid. If the scanner does not detect a free path during its first scan of the stage D, the TLN control becomes conditioned for the re-entry mode of operation at the time the last outlet from the stage E matrix is rescanned by operating the re-entry enable circuit. When the re-entry enable circuit is operated, all the re-entry connectors 276 (FIG. 4B) in all the TLN grids are conditioned for the re-entry path finding sequence. The re-entry enable circuit is operated by a ground signal on the lead REN from the TLN control via the grid selector 274 to operate the relay K1. This ground is applied by the TLN control if a free path is not detected during the first scan of the stage D. The operated relay K1 provides a hold path to itself via a ground on lead RER supplied by the TLN control. Ground is applied to RENC to signal the seizure of the re-entry enable circuit to the TLN control. The last MKN lead from each of the matrix connectors in the same grid are connected to one of the leads MKN1 through MKNX. When the re-entry enable circuit is operated, the MKN1 through MKNX leads are switched through to their respective re-entry connectors 276, so that the scanning arrangement can detect a path via another grid, or a different D stage in the same grid.

The re-entry enable circuit is released under one of two possible conditions. If re-entry had been requested, but a path was found without using the re-entry circuitry, ground from the lead RER was removed upon the release of the TLN control. If the re-entry circuitry is being used, ground from the lead RER is removed by the TLN control upon the operation of the re-entry connector.

RE-ENTRY CONNECTOR

Figure 24:
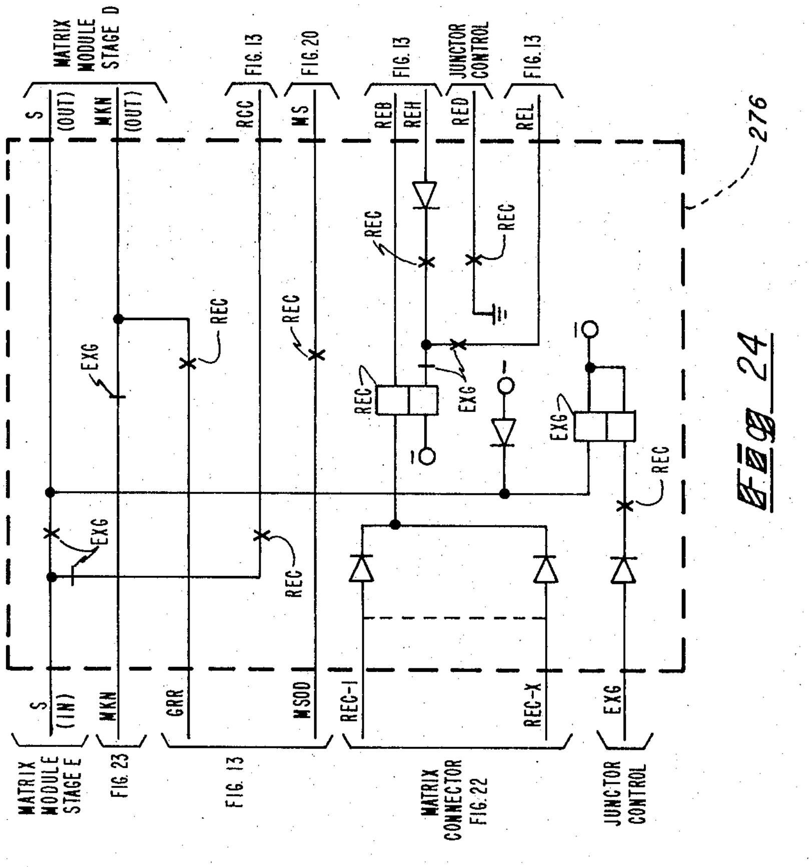
FIG. 24 is a schematic diagram of the TLN re-entry connector of FIG. 4B.

FIG. 24 includes a schematic diagram of the re-entry connector 276 (FIG. 4B) used to provide access to another path through the TLN control if a path has been detected via the re-entry sequence. The mark link circuits to all the re-entry connectors are conditioned for the re-entry path finding sequence by the operation of the re-entry enable circuit 267 when a free path is not detected during the first scan of the stage D, as described with regards to the scanner circuit of FIGS. 5-9. The scan of the same stage D matrix module will start for a second time. If a free path is found during the second scan and before the last link of the stage E matrix is scanned (the link allotted to re-entry), the re-entry circuit operation is skipped and the connection is completed without re-entry. If the scanner reaches the re-entry link, and a free path is detected through a re-entry connector, the re-entry connector is seized.

In the release condition (not seized) the lead MK(in) from the re-entry enable circuit is connected through the closed contacts EXG to the lead MK(out) connected to a stage D matrix module in another grid, or in the same grid, to provide a re-entry path. This enables the matrix scanner to detect a free path through: (1) the stages D and E previously scanned; (2) the re-entry enable circuit; (3) the re-entry connector circuit, and (4) the stages D, E and F of the re-entry path. If during the scan of the stage E, a free path is detected via re-entry, the re-entry connector through which the path has been detected is seized by an operated matrix connector applying ground to one of the leads REC (depending on the grid in which the termination attempt originated). At the end of the stage E scan, the TLN control applies resistance battery on the lead REB operating the relay REC. Ground on the lead REH from the TLN control provides a hold path for the relay REC. The operated relay REC applies a ground signal on the lead RED to the junctor control, signalling the seizure of the re-entry connector.

The junctor control picks up stages D and E of the first portion of the re-entry path, and provides a sleeve ground on the lead S(in). This ground is routed via the lead RCC to the TLN control where it operates the relay RCC. The TLN control now resets the scanner, releases the matrix connector and operates the proper matrix selector in the re-entry grid via the leads MSOP and MS through the matrix connector.

Now the re-entry grid is scanned in a manner as previously described. When a path has been identified (end of the stage E scan), the TLN control applies a ground signal on the lead GRR which is extended to the lead MK(out) operating the stages D, E and F in the re-entry grid and also the LLN crosspoints. When a metallic check has been completed on the tip and ring lines through both grids, the junctor control applies a ground signal on the lead EXG which operates relay EXG. The relay EXG switches the sleeve ground S(in) through to the lead S(out) and seals itself in onto this ground. The relay EXG also extends the ground on lead REH to the lead REL to apply a releasing signal to the TLN control. On the release of the TLN control, the ground on the lead REH is removed, which, in turn, drops out the relay REC. The relay EXG is now under the control of the sleeve ground from the junctor, and prevents any further path through this re-entry connector by breaking the mark lead.

RE-ENTRY MARK ENABLE

Figure 25:
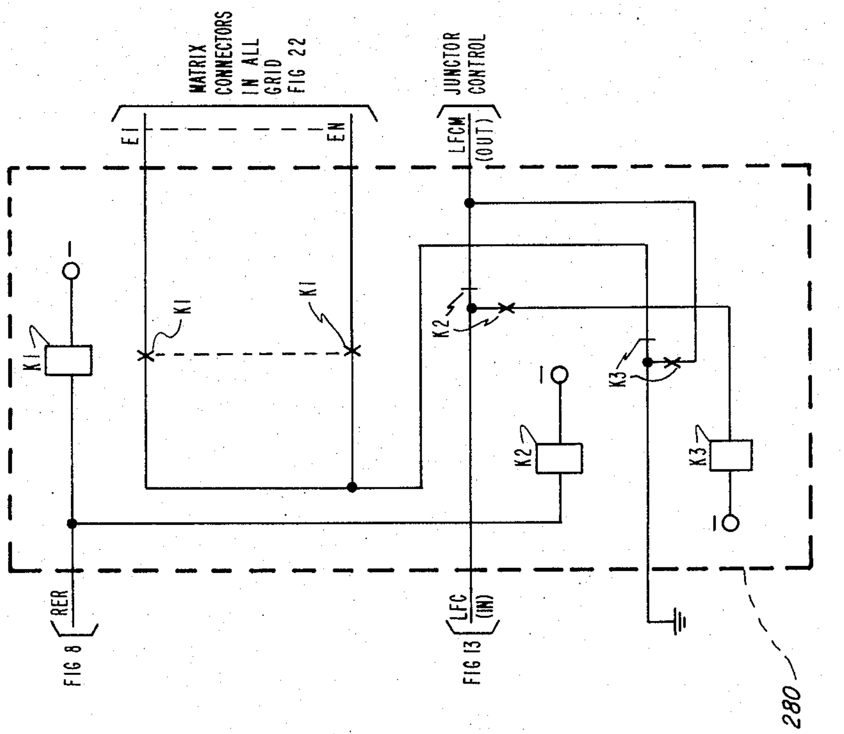
FIG. 25 includes a schematic diagram of the TLN re-entry marking enable circuit of FIG. 4B.

FIG. 25 includes a schematic diagram of the re-entry mark enable circuit 280 (FIG. 4B). When a call is being terminated without re-entry, the TLN control places a ground signal on the lead LFC indicating that the line finding process has been successfully completed. This signal is routed via the lead LFCM to the junctor control. When terminating a call with re-entry, when a count corresponding to the last link from the selected E stage module is reached, the scanner counter circuit (FIG. 8) applies a ground signal to the lead RER to operate the relay K1. The relay K1, when operated, applies a ground signal to all of the leads E1-EN, which are connected to operate all of the C1 relays (FIG. 22) in all of the matrix connectors 268 in all of the grids to condition the TLN network for the re-entry path finding sequence. The C1 relays in all of the matrix connectors switch through their respective mark leads and enable the TLN control to detect a free path in all the TLN grids during the second stage D scan.

If a free path has been detected and the path identified, the TLN control applies ground to the lead LFC. The ground on the lead LFC during re-entry is routed to pick up the relay K3 (rather than to the junctor control). When the relay K3 operates, the ground signal from the leads E1-EN is removed, thereby releasing all of the C1 relays in the matrix connectors with the exception of the C1 relay in the matrix connector in the selected path, which, in turn, is held operated by the signal on lead MCH (FIG. 22). The operated K3 relay also applies a ground signal to the junctor control via lead LFCM indicating that the re-entry line finding is complete and the junctor control applies the marking current to pick up the re-entry connector.

SLN PATH FINDING

Figure 26:
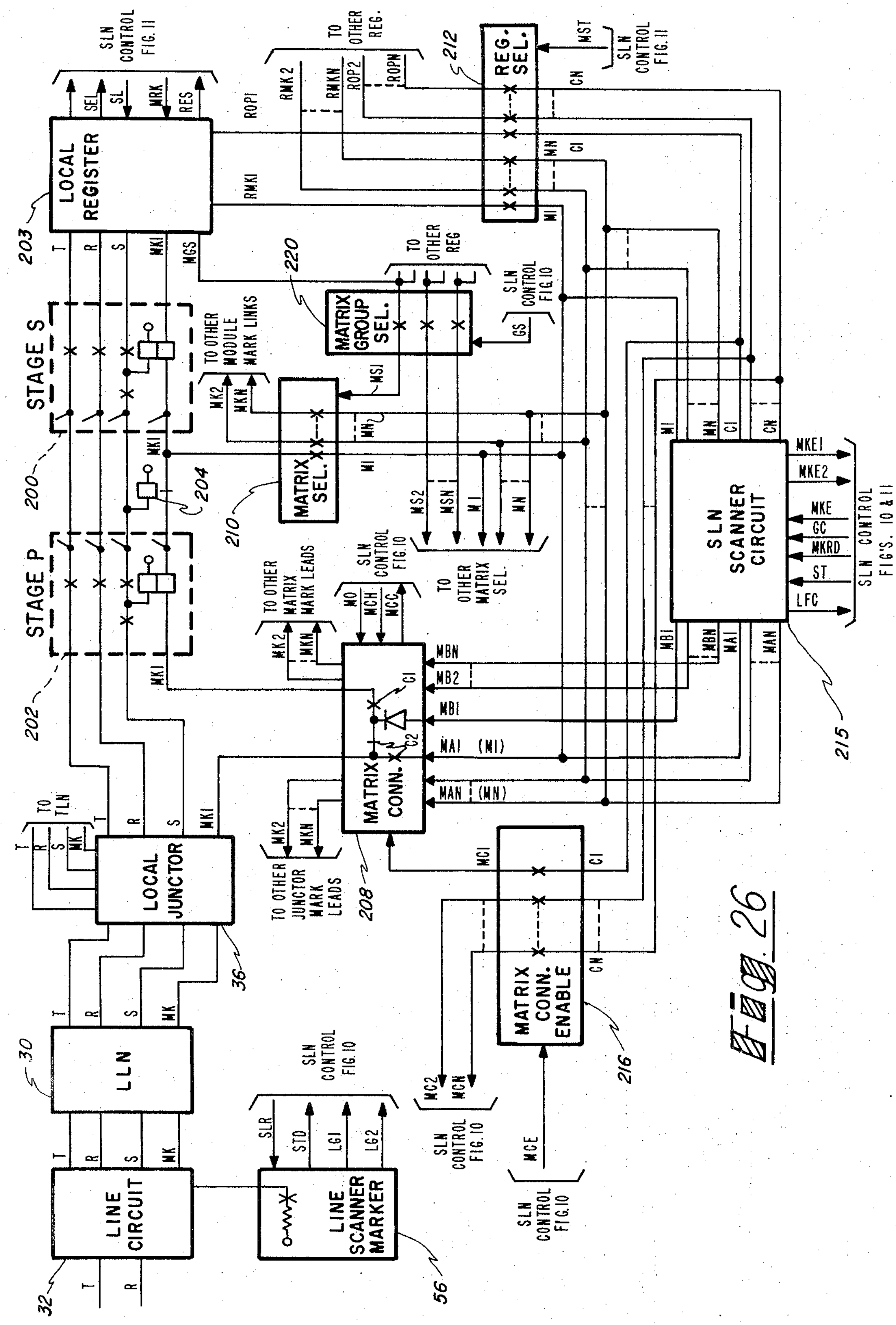
FIG. 26 includes a schematic diagram illustrating a path finding sequence for a single connection between a line circuit and a local register circuit via th SLN network.

FIG. 26 includes a simplified schematic diagram illustrating a single connection through the SLN network between the local register 203 and a line circuit 32, including the path finding system of the invention. When a telephone goes off hook, the line scanner-marker 56 locates the line circuit 32 requesting service and applies a battery potential to the mark lead MK of the line circuit. The line scanner-marker 56 also transmits a signal to the SLN control 42 on lead STD to initiate the path finding sequence. A signal is also applied to one of the leads LG1 and LG2 to identify to the SLN control the line group in which the line circuit 32 is located.

The SLN control, in response to the signals on the leads STD and LG from the line scanner-marker, applies a signal on the lead MO extending all the matrix connectors 208 having paths through the SLN network for the line circuit. As previously mentioned in regards to FIG. 17, the signal on lead MO operates the C1 relays in the matrix connectors to close the contacts C1 and complete the mark link connections between all the stage P matrices 202 and the junctor circuit 36. A signal is also applied on the MCH leads to all the matrix connectors 208 to hold all the matrix connectors operated during the first two scans of the SLN network. The SLN control also applies a signal on the lead MST to the register selector 212 to condition the network for the first scan sequence.

A signal from the SLN control is applied to the SLN scanner 215 via a lead ST to start the scanning operation. Scanning pulses are sequentially applied on the leads M1-MN and through the register selector 212 to the various local registers for detecting a free path. In FIG. 26, it can be assumed that a free path is found through the path illustrated. The presence of the free path stops the SLN scanner and a signal is applied on the corresponding one of the leads C1-CN (C1 in the circuit of FIG. 26) via the register selector to a lead ROP1-ROPN (ROP1 in the circuit of FIG. 26) to seize and identify the local register included in the free path.

The seized local register applies a signal on the lead SEL to indicate to the SLN control that the register was seized. The SLN control removes the signal from the lead MST and thereby releases the register selector 212. A GS signal is now applied by the SLN control to operate the appropriate matrix group selector 220. A signal on the lead MGS from the register 203 is applied via the operating matrix group selector 220 to operate a matrix selector circuit 210 corresponding to the matrix module to which the register is connected. At the same time, the SLN control applies a signal on the lead MCE to operate the matrix connector enable circuit 216 which prepares the connector circuits for selection by the second scanning sequence. The system is now conditioned for the second path finding scan and the scanning pulses are now restricted to the matrix selectors.

A signal is now applied on the ST lead to restart the scanner circuit 215 for the second scan. The scanning pulses on lead M1-MN are now applied through the operated matrix selector 210 to sequentially scan the mark leads between the selected module in the stages P and S of the SLN network. It can be assumed for the present example that the scan pulse on lead M1 detects a free path on the mark lead MK1 and thereby identifies the stage P module including a free path, and the scanner circuit 215 is stopped. A ground signal is developed on a corresponding one of the leads C1-CN (C1 in the circuit of FIG. 25) that is now transmitted through the matrix connector enable circuit 216 to apply a signal on the lead MC1 to operate the relay C2 in the matrix connector 208 including the detected free path. The relays C1 and C2 in the selected matrix connector are now held in via the signal on the lead MCH. The selected matrix connector applies a signal to the SLN control via the lead MCC to indicate that the second scan has been completed and a matrix connector selected. The SLN control now removes the signal on all the leads MO extending to all the matrix connectors and thereby releases all the matrix connectors except the selected matrix connector having both relays C1 and C2 operated. The SLN control also removes the signals on the leads GS and MCE releasing the matrix group selector 220 and matrix connector enable 216, respectively, restricting the scanning pulses to the selected matrix connector. The connection across the leads MKE1 and MKE2 in the scanner are now opened indicating to the SLN control that this is the last scan. The SLN control now removes a signal to the SLN scanner via lead GC to disable the outputs on the lead C1-CN.

A signal is now applied by the SLN control to the lead ST to restart the SLN scanner for the third time. The scanning pulses are again developed on the leads M1-MN and are now applied via the matrix connector 208 to the mark leads extending to the various junctors connected to the selected matrix connector. When a free path is detected, the SLN scanner is stopped and a signal is applied to the SLN control via the lead LFC indicating that line finding is complete. The SLN control now applies a ground signal to the mark lead MK1 in the local register 203 via the lead MRK. A ground signal is also applied to one of the leads MA1-MAN, and battery potential is applied to one of the leads MB1-MBN that correspond to the scanner lead M1-MN that located the free path. In the path illustrated in FIG. 26, a ground signal will be applied to the lead MA1 while battery potential is applied to the lead MB1. The ground signal on the lead MA1 extends through the matrix connector 208, the mark leads in the junctor 36, the LLN network 30, the line circuit 32 and the line scanner-marker 56 to complete the mark circuit of the first portion of the free path. The battery potential on the lead MB1 is applied through the matrix connector and the mark circuit through the matrices in the stages P and S, and the local register 203, to complete the mark circuit in the second portion of the free path. When the mark circuits are complete, the matrix relays in the free path are actuated and the tip T and the ring R and sleeve S circuits are completed.

A check is now made on the metallic connection through the tip and ring lines (as previously mentioned with regards to the SLN control of FIGS. 10 and 11). If the tip and ring connections is complete, the SLN control applies a ground to the lead SL in the seized local register providing a sleeve ground for the entire free path and thereby energizes the sleeve coils corresponding to the operated matrix relays. The junctor circuit, in response to the sleeve ground provided by the SLN control, also applies a ground to the sleeve circuit. The SLN control now removes the ground on the lead MRK and also applies a signal on the lead MKRD to release the mark circuit. When the mark circuit is released, the local register applies a signal to the SLN control on lead RES causing the SLN control to release, which, in turn, removes the ground on the lead SL so that the path is now held under the control of the sleeve ground in the local junctor 36.

TSLN PATH FINDING

Figure 27:
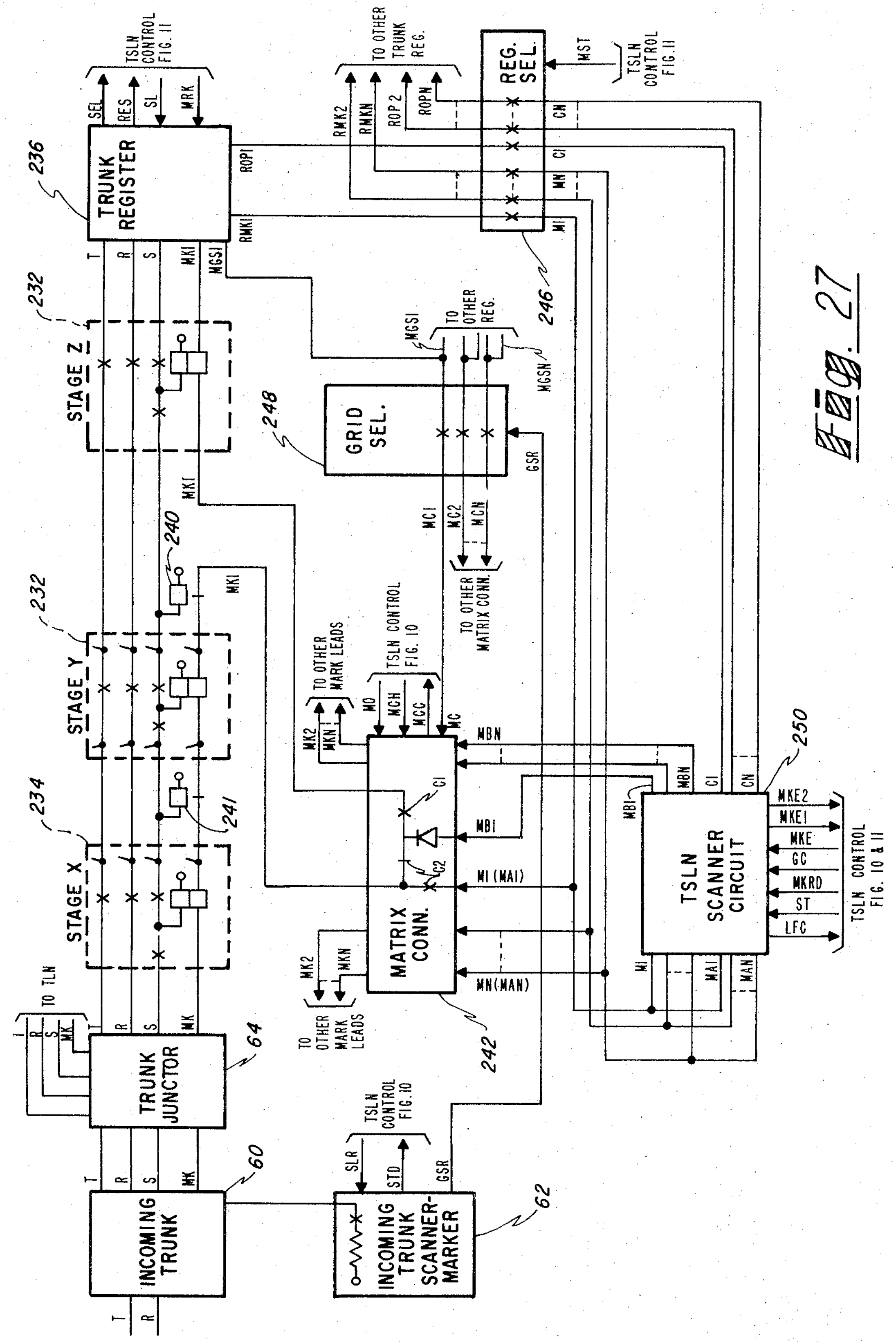
FIG. 27 includes a schematic diagram illustrating a path finding sequence for single connection between a trunk junctor and a trunk register via the TSLN network, and FIG. 28 includes a schematic diagram illustrating a path finding sequence for a single connection between a pair of line circuits through the LLN and TLN networks.

FIG. 27 includes a simplified schematic diagram illustrating a single connection through the TSLN network between a trunk register 236 and an incoming trunk 60 including the path finding system of the invention. When an incoming trunk call is present, the incoming trunk scanner-marker 62 locates the incoming trunk and applies a battery potential to the mark lead MK of the incoming trunk. The incoming trunk scanner-marker 62 also transmits a signal to the TSLN control on the lead STD to initiate the path finding sequence. A signal is also applied to the GSR lead to operate the grid selector circuit 248 corresponding to the grid in which the trunk junctor 64 is connected.

The TSLN control, in response to the signal on the lead STD, applies a signal on the lead MO extending to all of the matrix connectors 242 in the same grid. As previously mentioned in regard to FIG. 17, the signal on the lead MO operates the C1 relays in the matrix connectors to close the contacts C1 and complete the mark link connections between the stages Y and Z matrix modules. A signal is also applies on the MCH leads to all the matrix connectors in the selected grid to hold the matrix connectors operated during the first scan of the TSLN network. The TSLN control also applies a signal on the lead MST to the register selector 246 to condition the network for the first scan sequence.

A signal from the TSLN control is supplied to the TSLN scanner circuit 250 via a lead ST to start the scanning operation. Scanning pulses are sequentially applied on the leads M1-MN and through the register selector 246 to the various trunk registers for detecting a free path. In FIG. 27, it can be assumed that a free path is found through the circuit as illustrated. The presence of a free path stops the TSLN scanner and a signal is applied on the corresponding one of the leads C1-CN (C1 in the circuit of FIG. 27) via the register selector to a lead ROP1-ROPN (ROP1 in the circuit of FIG. 26) to seize and identify the trunk register included in the free path.

The seized trunk register applies a signal on the lead SEL to indicate to the TSLN control that the register was seized. The TSLN control removes the signal from the lead MST and thereby releases the register selector. The trunk register also applies a signal on the lead MGS which is transmitted through the operated grid selector 248 via the lead MC1 to operate the the relay C2 included within the matrix connector 242 that includes the detected free path. The relays C1 and C2 in the selected matrix connector are now both held via the signal on the lead MCH. The selected matrix connector applies a signal to the TSLN control via the lead MCC to indicate that a matrix connector has been selected. The TSLN control now removes the signal on the leads MO extending to all the matrix connectors and thereby releases all the matrix connectors, except the matrix connectors having both the C1 and C2 relays operated. The connection across the leads MKE1 and MKE2 in the scanner are now opened indicating to the TSLN control that this is the last scan. The TSLN control now removes a signal from the TSLN scanner via lead GC to disable the outputs on the leads C1-CN. A signal is now applied by the TSLN control to the lead ST to restart the TSLN scanner restricting the second scanning pulses to the matrix connector.

The scanning pulses are again developed on the leads M1-MN and are now applied to the matrix connector 242 to the mark leads extending to the stage Z matrix module connected to the selected matrix connector. When a free path is detected, the TSLN scanner is stopped and a signal is applied to the TSLN control via the lead LFC indicating that path finding is complete. The TSLN control now applies a ground signal to the mark lead in the trunk register 236 via the lead MRK. A ground is also applied to one of the leads MA1-MAN and battery potential is applied to one of the leads MB1-MBN that corresponds to the scanner lead M1-MN that located the free path. In the path illustrated in FIG. 27, a ground signal will be applied to the lead MA1 while battery potential is applied to the lead MB1. The ground signal on the lead MA1 extends through the matrix connector 242, the mark leads in the stages X and Y, trunk junctor 64, the incoming trunk 60, and the trunk scanner-marker 62 to complete the mark circuit of the first portion of the free path. The battery potential on the lead MB1 is applied through the matrix connector and the mark circuit through the matrix modules in stage Z and the seized trunk register 236 to complete the mark circuit in the second portion of the free path. When the mark circuits are complete, the matrix relays in the free path are actuated and the tip T, ring R and sleeve S circuits are completed.

A check is now made on the metallic connection through the tip and ring lines (as previously mentioned with regards to the TSLN control of FIGS. 10 and 11). If the tip and ring connection is complete, the TSLN control applies a ground to the lead SL in the seized local register providing a sleeve ground for the entire free path and thereby energizes the sleeve coils corresponding to the operated matrix relays. The junctor circuit, in response to the sleeve ground provided by the TSLN control, also applies a ground to the sleeve circuit. The TSLN control now removes the ground on the lead MRK and also applies a signal on the lead MKRD to remove the ground on the lead MA1, thereby releasing the mark circuit. When the mark circuit is released, the trunk register applies a signal to the TSLN control on the lead RES causing the TSLN control to release, which, in turn, removes the ground on the lead SL so that the path is now held over the control of the sleeve ground in the trunk junctor 64.

TLN PATH FINDING

Figure 28:
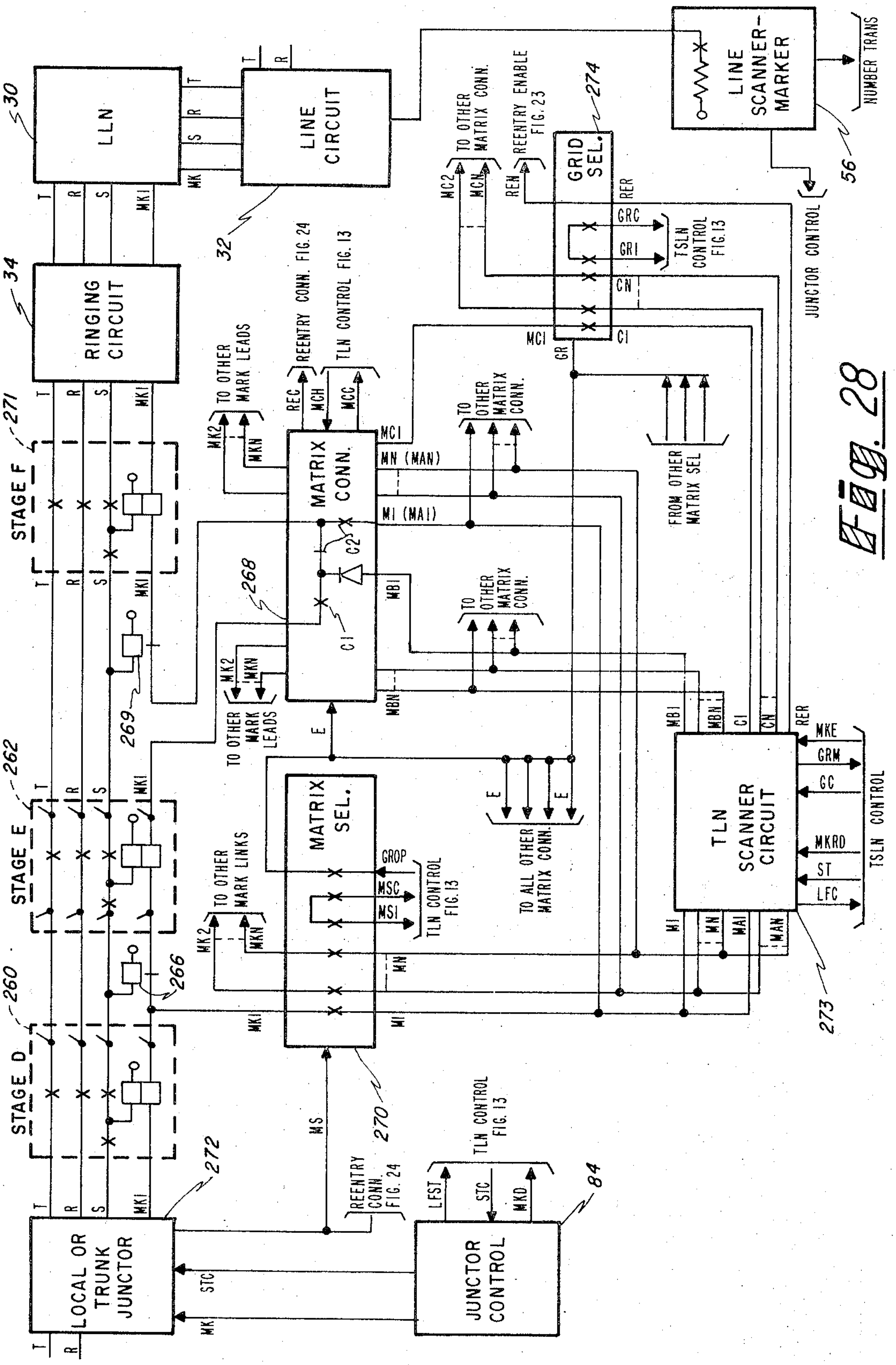

FIG. 28 includes a simplified schematic diagram illustrating a single connection through the TLN network interconnecting a local or trunk junctor 272 and a line circuit 32, including a path finding system of the invention. The line scanner-marker 56, in response to a signal from the number translator 50, applies battery potential to the line circuit 32 to be connected to the trunk 272. The line scanner-marker also signals the junctor control 84 when the line marking is complete. The TLN control 82 is seized by the junctor control 84 by a signal on the lead LFST. A signal is also applied to the junctor control by the TLN control on the lead STC, which, in turn, is routed through the seized junctor 272 to operate the matrix selector 270 via the lead MS. The operated matrix selector circuit connects the TLN scanner circuit 273 to the mark links connected between the stage D matrix module associated with the junctor 272 and the stage E matrix modules. The operated matrix selector also interconnects the leads MS1 and MSC indicating to the TLN control that the matrix selector has been operated. A signal from the TLN control is now applied to the lead GROP and through the operated matrix selector to operate the relay C1 in all the matrix connectors in the same grid (via lead E), and also operates the grid selector circuit 274 (via lead GR). A signal is also applied by the TLN control on all the leads MCH extending to all the matrix connectors in the grid to maintain the relays C1 operated during the first scan. The operated grid selector 274 connects all the matrix connectors to the TLN scanner for selection by the path finding process. The connection between the leads GR1 and GRC is closed to indicate to the TLN control that the grid selector has been operated wherein the TLN control applies a start signal to the TLN scanner 273 via the lead ST.

The scanning pulses are now sequentially developed at the leads M1-MN and are transmitted through the operated matrix selector for sequentially scanning the mark links from the stage D module. In FIG. 28, it can be assumed that a free path has been found that corresponds to the circuit illustrated. The presence of a free path stops the TLN scanner and a signal is applied on the corresponding one of the leads C1-CN (C1 in the circuit of FIG. 28) via the grid selector 274 to one of the leads MC1-MCN (MC1 in the circuit of FIG. 28) to select the matrix connector 268 included in the free path to operate the relay C2 in the matrix connector. A signal is applied by the selected matrix connector to the lead MCC indicating to the TLN control that a matrix connector has been selected. The TLN control now removes the signal from the leads MCH so that the only matrix connector remaining operated is the one selected by the path finding sequence (i.e., the connection having the relay C2 previously operated). The TLN control now signals the junctor control 84 to release the matrix selector which, in turn, releases the grid selector. The TLN network is now conditioned for the second scanning sequence by restricting the scanning pulses to the selected matrix connector 268.

When the loop between the lines GR1 and GRC is open (the grid selector released), a start scan signal from the TLN control is applied to the lead ST to the TLN scanner to start the second scanning sequence. The sequentially scanning pulses developed across the leads M1-MN are now applied via the selected matrix connector to the mark leads extending to the various F stage modules. When a free path is detected, the TLN scanner is stopped and a signal is applied to the TLN control via the lead LFC indicating that line finding is complete. The TSLN control now signals the junctor control 84 to apply ground to the junctor mark lead MK1. The TLN scanner applies a ground signal to one of the leads MA1-MAN, and battery potential applied to one of the leads MB1-MBN, that correspond to the scanner lead M1-MN that located the free path. In the path illustrated in FIG. 28, a ground signal will be applied to the lead MA1 while battery potential is applied to the lead MB1. The battery potential on the lead MB1 extends through the matrix connector 268, the mark coils in the stages D and E matrix modules included in the free path to the junctor mark lead MK1 to complete the first portion of the free path. A ground signal on the lead MA1 extends through the matrix connector 268, the mark coil of the stage F matrix module, the ringing circuit 34, the LLN 30 to the line circuit 32 to complete the mark circuit of the second portion of the free path. When the mark circuits are complete, the matrix relays in the free path are actuated and the tip T, ring R and the sleeve S circuits are completed. A check is now made in the junctor circuit on the metallic connection through the tip and ring lines. If the tip and ring connection is complete, the TSLN control signals the junctor control 84 to signal the junctor 272 to apply a ground potential to the sleeve circuit, thereby energizing all the sleeve coils in the free path. The SLN control now applies a signal to the TLN scanner on the lead MKRD to release the mark circuit and so that the path is now held under the control of the sleeve ground in the junctor 272 and the common control circuitry is released.

What is claimed is:

1. An electrical circuit for connection in series with the control link connections of a matrix switching network comprising:

first, second, third and fourth plurality of terminals;

first relay means including a plurality of normally open contacts;

a second relay means including a plurality of normally open contacts and a plurality of normally closed contacts;

first circuit means connecting individual ones of the normally open contacts of said first relay means in a series circuit with individual ones of the normally closed contacts of said second relay means between separate ones of said first and second terminals to provide a plurality of switching circuits for connection in series with the link connections;

second circuit means for connecting separate ones of said third plurality of terminals to individual ones of said first plurality of terminals through separate ones of the normally open contacts of said second relay means;

third circuit means for connecting separate ones of said fourth plurality of terminals to individual ones of said series circuits at the junction of the normally open contacts of said first relay means and the normally closed contacts of said second relay means;

fourth circuit means for receiving signals for operating said first relay means, and fifth circuit means for receiving signals for operating said second relay means so that the first relay means is maintained operated while said second relay means is operated.

2. An electrical circuit as defined in claim 1 wherein said third circuit means includes a separate diode connected in series between individual ones of said fourth plurality of terminals and said series circuits.

3. An electrical circuit as defined in claim 2 wherein said fifth circuit means connects said first relay means to said third circuit means through normally open contacts of said second relay means.

* * * * *